United States Patent
Kato et al.

(10) Patent No.: US 8,482,261 B2
(45) Date of Patent: Jul. 9, 2013

(54) SEMICONDUCTOR DEVICE

(75) Inventors: Kiyoshi Kato, Kanagawa (JP); Kazuma Furutani, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 13/447,397

(22) Filed: Apr. 16, 2012

(65) Prior Publication Data

US 2012/0200255 A1 Aug. 9, 2012

Related U.S. Application Data

(62) Division of application No. 11/960,014, filed on Dec. 19, 2007, now Pat. No. 8,159,193.

(30) Foreign Application Priority Data

Dec. 26, 2006 (JP) .................................. 2006-349381

(51) Int. Cl.
*H02J 7/00* (2006.01)
*H02J 7/16* (2006.01)

(52) U.S. Cl.
USPC ........... 320/138; 320/134; 320/136; 320/137; 324/425; 324/426

(58) Field of Classification Search
USPC ................. 320/134, 138, 135, 136, 137, 148, 320/149, 161, 156, 132, 127, 128; 324/425, 324/435
See application file for complete search history.

(56) References Cited

U.S. PATENT DOCUMENTS

| 5,467,007 | A | * | 11/1995 | Hyakutake | 320/158 |
| 5,583,417 | A | * | 12/1996 | Yuen | 320/160 |
| 5,721,481 | A | | 2/1998 | Narita | |
| 5,729,061 | A | * | 3/1998 | Narita | 307/130 |
| 5,859,873 | A | | 1/1999 | Ritter | |
| 6,262,903 | B1 | | 7/2001 | Fujihashi et al. | |
| 6,304,059 | B1 | * | 10/2001 | Chalasani et al. | 320/118 |
| 6,343,022 | B1 | | 1/2002 | Naruse | |
| 6,384,577 | B1 | * | 5/2002 | Kikuchi et al. | 320/134 |
| 6,407,534 | B1 | * | 6/2002 | Mukainakano | 320/162 |
| 6,445,936 | B1 | * | 9/2002 | Cannon et al. | 455/573 |

(Continued)

FOREIGN PATENT DOCUMENTS

| EP | 1 089 217 A1 | 4/2001 |
| GB | 2 292 866 A | 3/1996 |

(Continued)

*Primary Examiner* — Edward Tso
*Assistant Examiner* — Alexis Boateng
(74) *Attorney, Agent, or Firm* — Husch Blackwell LLP

(57) ABSTRACT

A semiconductor device which can operate normally even when the communication distance is extremely short, and which stores excess electric power which is not needed for circuit operation of the semiconductor device when a large amount of electric power is supplied thereto. The following are included: an antenna; a first AC/DC converter circuit which is connected to the antenna; a second AC/DC converter circuit which is connected to the antenna through a switching element; a detecting circuit which controls operation of the switching element in accordance with the value of a voltage output from the first AC/DC converter circuit; and a battery which stores electric power supplied from the antenna through the second AC/DC converter circuit. When the switching element is operated, electric power supplied from outside is at least partly supplied to the battery through the second AC/DC converter circuit.

13 Claims, 22 Drawing Sheets

U.S. PATENT DOCUMENTS

| | | |
|---|---|---|
| 6,462,647 B1 | 10/2002 | Roz |
| 6,703,811 B2 | 3/2004 | Kim |
| 6,837,438 B1 | 1/2005 | Takasugi et al. |
| 6,944,424 B2 | 9/2005 | Heinrich et al. |
| 7,064,346 B2 | 6/2006 | Kawasaki et al. |
| 7,202,636 B2 | 4/2007 | Reynolds et al. |
| 7,208,915 B2 | 4/2007 | Kubota et al. |
| 7,239,111 B2 * | 7/2007 | Fischer et al. ............... 320/111 |
| 7,521,890 B2 | 4/2009 | Lee et al. |
| 7,674,650 B2 | 3/2010 | Akimoto et al. |
| 7,688,037 B2 * | 3/2010 | Huh ............................ 320/138 |
| 2002/0070708 A1 | 6/2002 | Wu |
| 2003/0132931 A1 | 7/2003 | Kimura et al. |
| 2004/0145454 A1 | 7/2004 | Powell et al. |
| 2005/0156574 A1 | 7/2005 | Sato et al. |
| 2005/0280509 A1 | 12/2005 | Tanaka et al. |
| 2006/0197092 A1 | 9/2006 | Hoffman et al. |
| 2006/0214639 A1 | 9/2006 | Miwa et al. |
| 2007/0108446 A1 | 5/2007 | Akimoto |
| 2007/0152217 A1 | 7/2007 | Lai et al. |
| 2007/0229228 A1 | 10/2007 | Yamazaki et al. |
| 2007/0268001 A1 | 11/2007 | Doll et al. |
| 2008/0258139 A1 | 10/2008 | Ito et al. |
| 2010/0171117 A1 | 7/2010 | Kuwabara et al. |

FOREIGN PATENT DOCUMENTS

| | | |
|---|---|---|
| JP | 8-55198 | 2/1996 |
| JP | 11-345292 | 12/1999 |
| JP | 2000-90221 | 3/2000 |
| JP | 2000-197365 | 7/2000 |
| JP | 2000-201442 | 7/2000 |
| JP | 2001-67446 | 3/2001 |
| JP | 2001-101364 | 4/2001 |
| JP | 2002-176141 | 6/2002 |
| JP | 2002-368647 | 12/2002 |
| JP | 2005-316724 | 11/2005 |
| JP | 2006-5651 | 1/2006 |

* cited by examiner

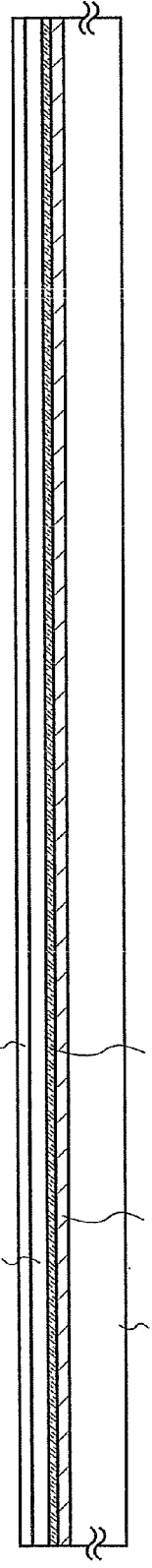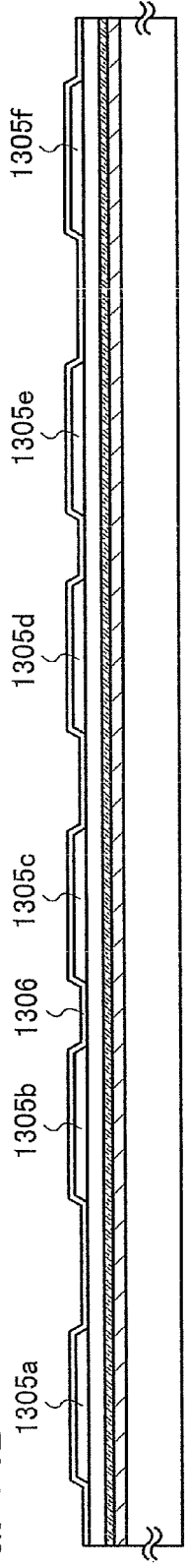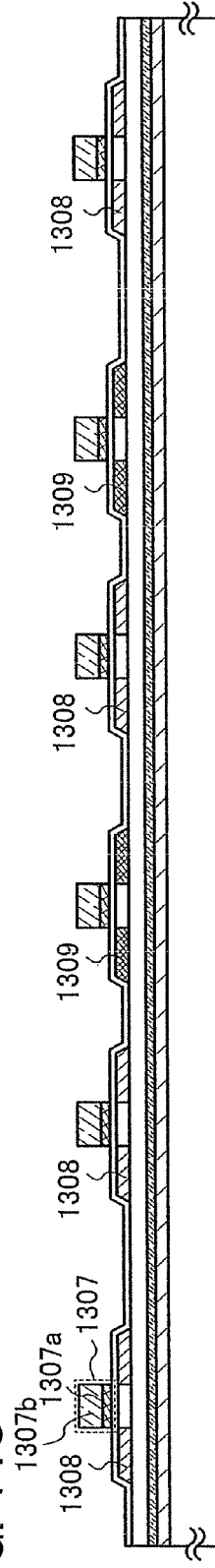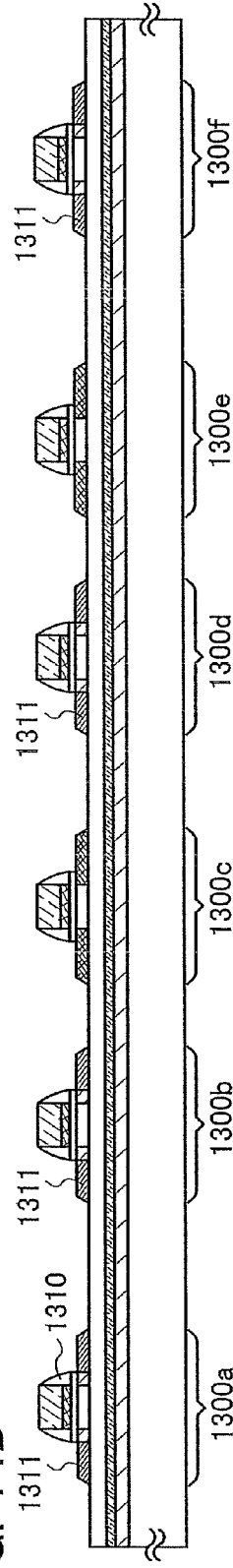

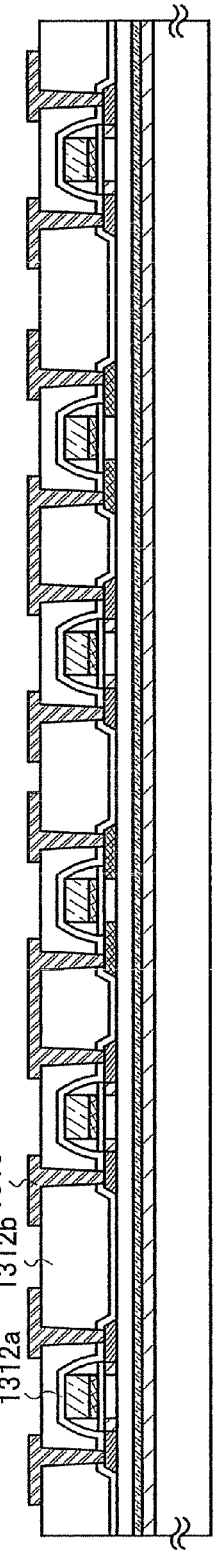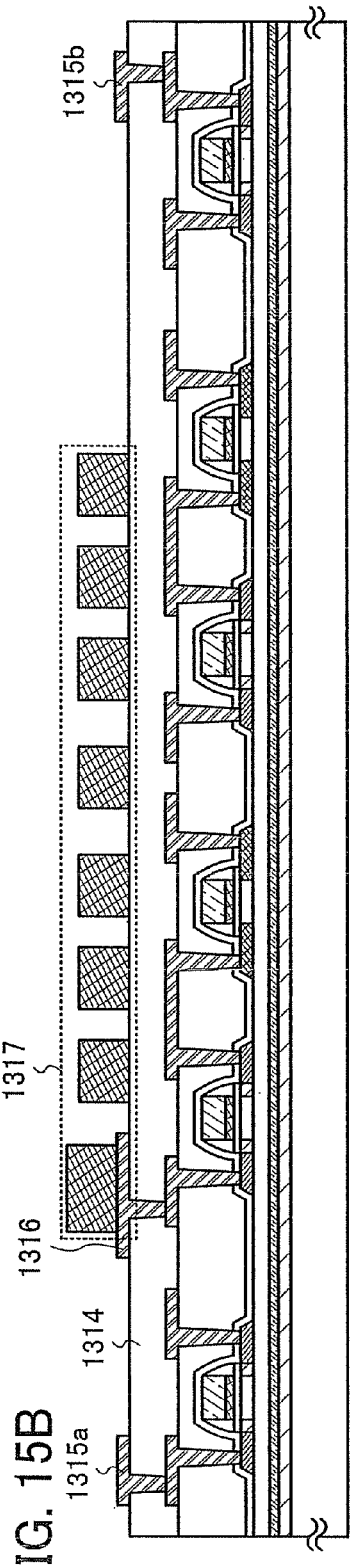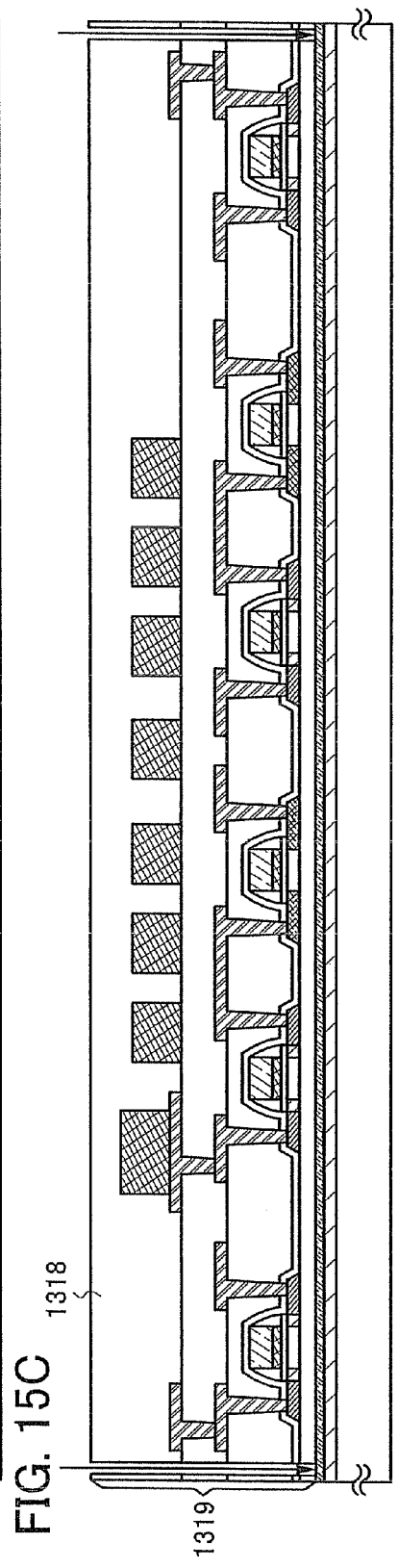

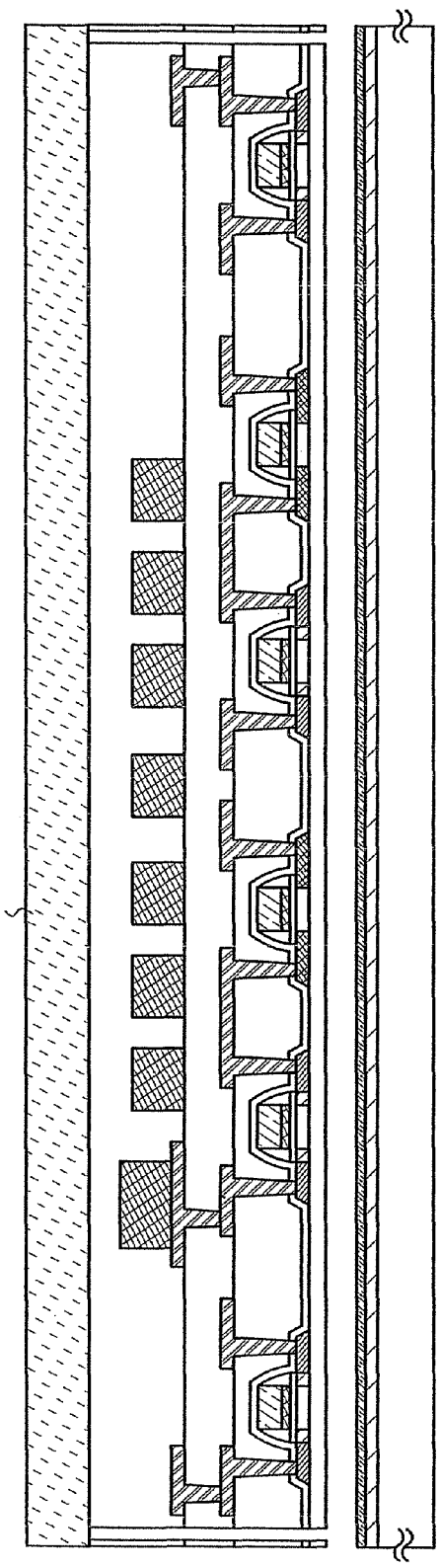
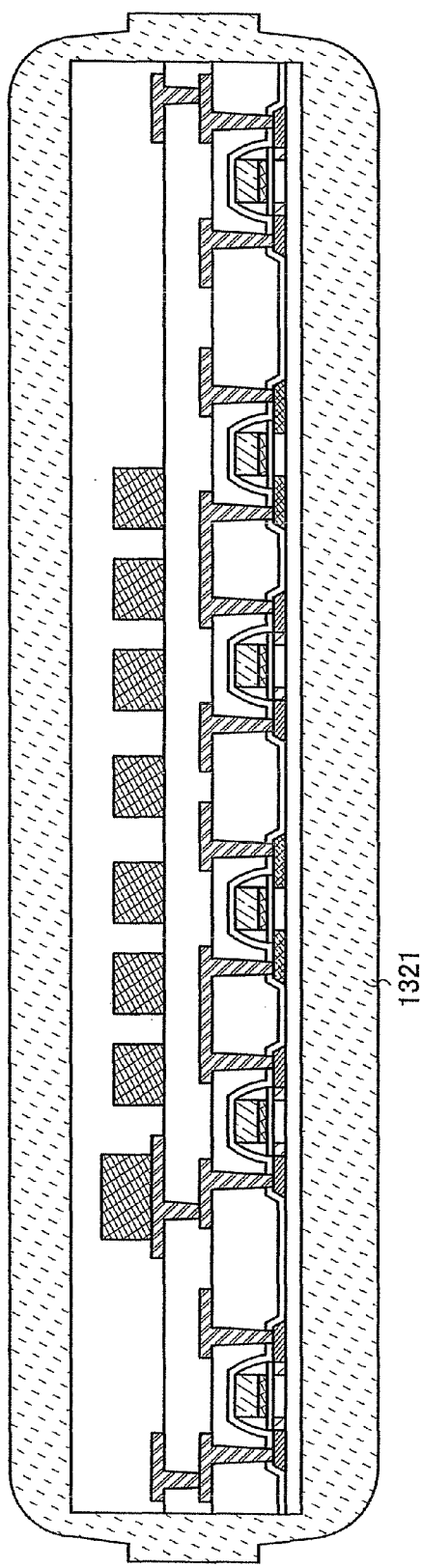
FIG. 16A
FIG. 16B

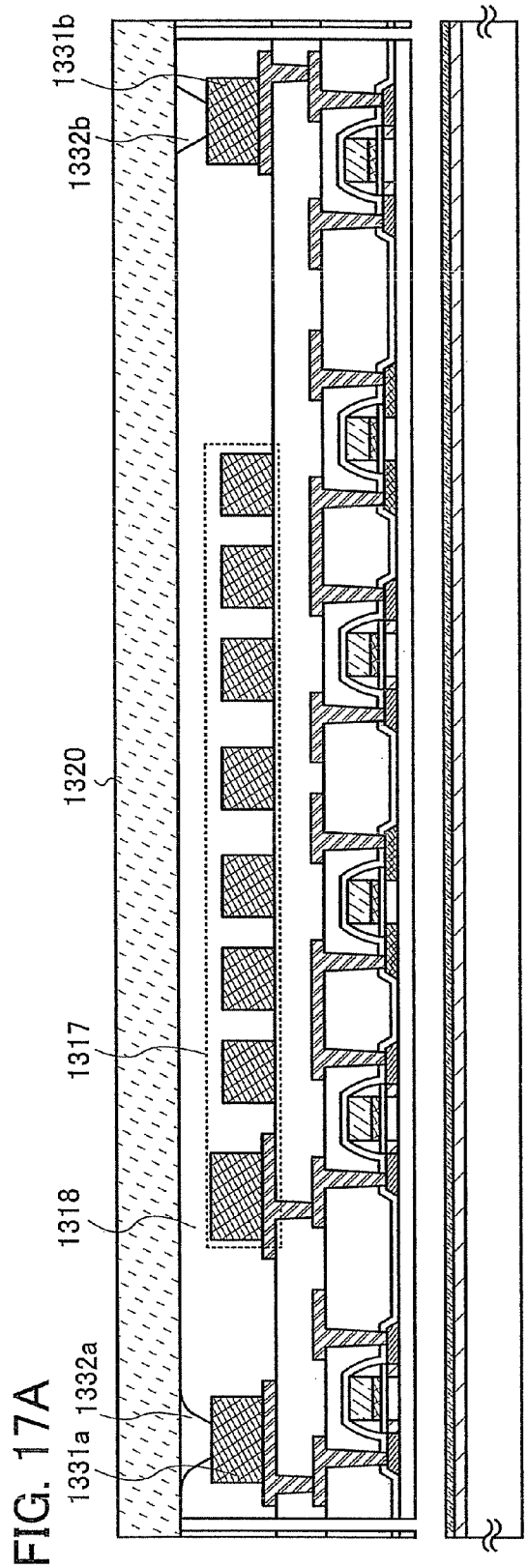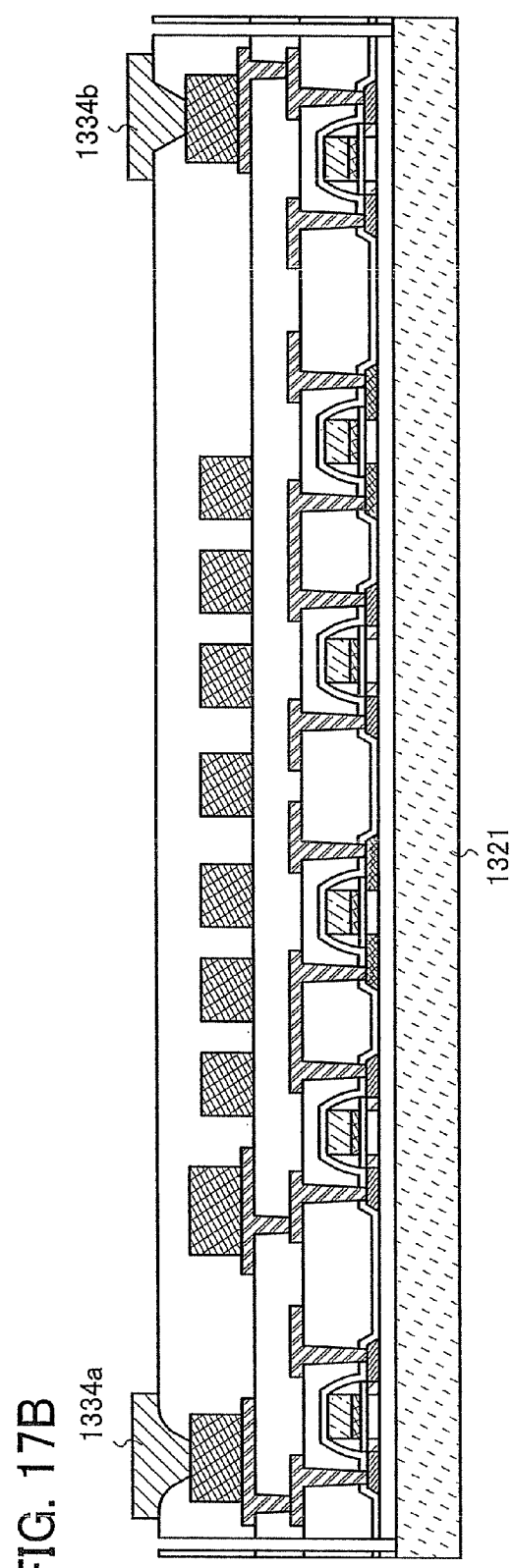

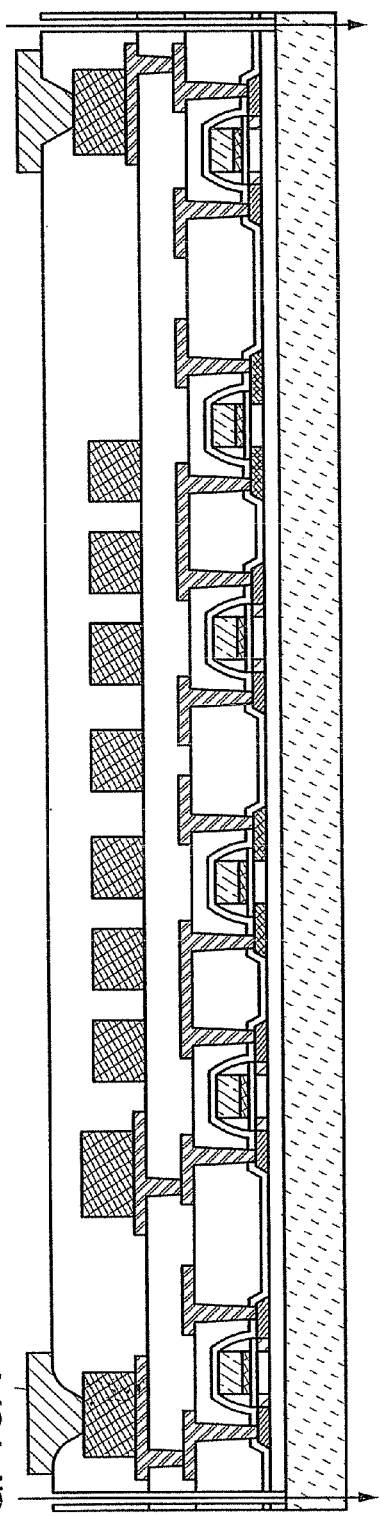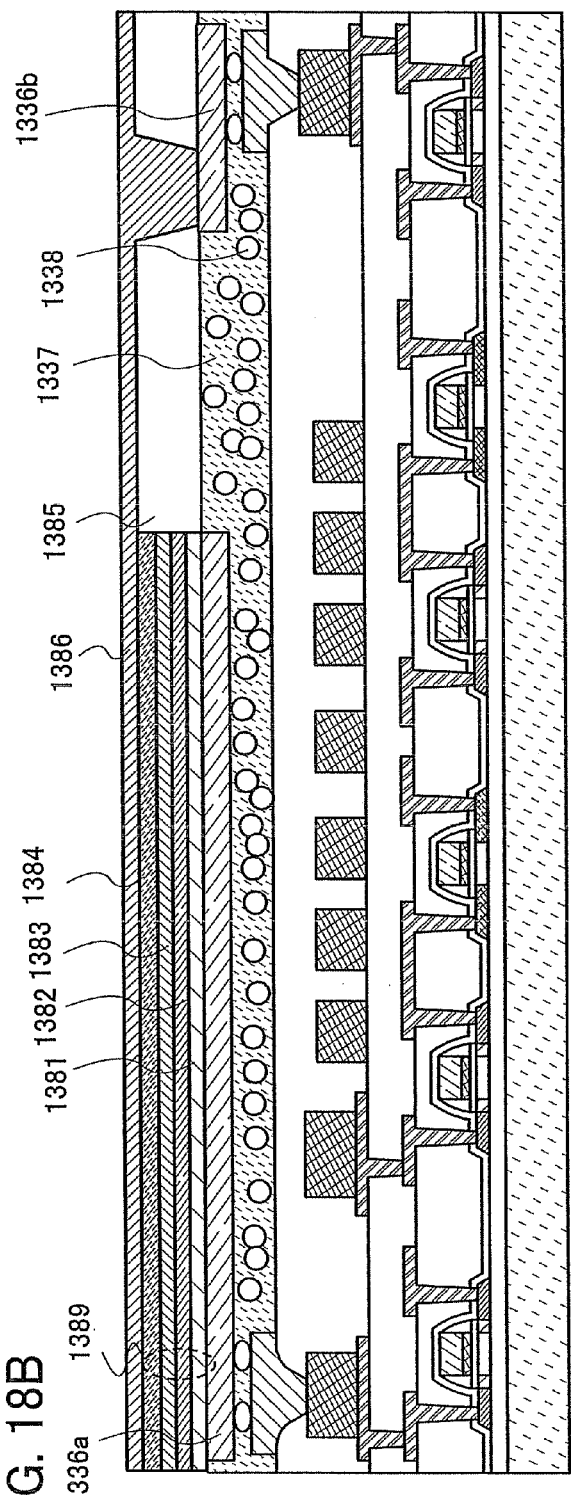
FIG. 18A
FIG. 18B

SEMICONDUCTOR DEVICE

This application is a divisional of application Ser. No. 11/960,014 filed Dec. 19, 2007 now U.S Pat. No. 8,159,193.

BACKGROUND OF THE INVENTION

1. Field of the Invention

The present invention relates to a semiconductor device which performs data communication (reception and transmission) by wireless communication. The present invention relates to, in particular, a semiconductor device including a protection circuit which prevents element deterioration or element destruction of the semiconductor device when a large amount of electric power is received by wireless communication.

2. Description of the Related Art

Nowadays, an individual identification technology using wireless communication (hereinafter referred to as a wireless communication system) has attracted attention. In particular, as a data carrier which communicates data by wireless communication, an individual identification technology with a semiconductor device utilizing an RFID (Radio Frequency Identification) technology (also called an RFID tag, an RF tag, an IC (Integrated Circuit) tag, an IC chip, a wireless tag, or an electronic tag) has attracted attention. The semiconductor device which can perform data reception and transmission by wireless communication has started to be used for production, management, or the like of an individual object and has been developed to be applied to personal authentication.

A wireless communication system herein is a communication system which wirelessly exchanges data between a power supply source and transceiver such as a reader/writer and a transceiver such as a semiconductor device.

The wireless communication system does not need a physical connection between the reader/writer and the semiconductor device. That is, as log as the semiconductor device exists in a region specified by the reader/writer, data can be exchanged with the semiconductor device by communication between the reader/writer and the semiconductor device.

As for the reader/writer and the semiconductor device, in order to extend the communication distance therebetween, research and development for increasing the power supply efficiency from the reader/writer to the semiconductor device has been activated (e.g., reference 1: Japanese Published Patent Application No. 2006-5651).

SUMMARY OF THE INVENTION

On the other hand, in the wireless communication system, when data in a plurality of semiconductor devices is read by a reader/writer at the same time, the distance between the reader/writer and each semiconductor device (hereinafter referred to as a communication distance) may vary. Further, the communication distance may vary from hour to hour, like the case where a carton of products provided with a semiconductor device is passed through a reader/writer by using a forklift truck.

In general, electric power is attenuated in proportion to the squared distance between a radiant point of electric power and a measurement point of the electric power. That is, depending on the communication distance, electric power supplied from the reader/writer to the semiconductor device varies.

Therefore, particularly when the communication distance is extremely short, such as the case where the reader/writer and the semiconductor device are in contact with each other, a large amount of electric power is supplied to the semiconductor device. When a large amount of electric power is supplied to the semiconductor device, the semiconductor device cannot correctly demodulate a signal from the reader/writer and malfunctions, so that an internal element of the semiconductor device is deteriorated. In the worst case, the semiconductor device itself could be destroyed.

Further, there is a method in which a protection circuit is provided inside a semiconductor device in order to suppress deterioration and destruction of an element and voltage value which is greater than or equal to a constant voltage value is prevented from being applied to an element of the semiconductor device even when a large amount of electric power is supplied thereto, by provision of the protection circuit which divides electric power. In this case, however, electric power supplied from outside is wasted.

The present invention is made in view of the foregoing problems, and an object of the present invention is to provide a semiconductor device which operates normally even when the communication distance is extremely short and which stores excess electric power which is not needed for circuit operation of the semiconductor device when a large amount of electric power is supplied thereto.

One aspect of the present invention is a semiconductor device that includes an antenna, a first AC/DC converter circuit which is connected to the antenna, a second AC/DC converter circuit which is connected to the antenna through a switching element, a detecting circuit which controls operation of the switching element in accordance with the value of a voltage output from the first AC/DC converter circuit, and a battery which stores electric power supplied from the antenna through the second AC/DC converter circuit. That is, when the switching element is operated, electric power supplied from outside is at least partly supplied to the battery through the second AC/DC converter circuit.

Another aspect of the present invention is a semiconductor device that includes an antenna, a first AC/DC converter circuit which is connected to the antenna, a second AC/DC converter circuit which is connected to the antenna through a switching element, a detecting circuit which controls operation of the switching element in accordance with the value of a voltage output from the first AC/DC converter circuit, a battery which stores electric power supplied from the antenna through the second AC/DC converter circuit, and a logic circuit to which electric power supplied from the antenna through the first AC/DC converter circuit and electric power supplied from the battery is supplied.

Another aspect of the present invention is a semiconductor device that includes an antenna, a first AC/DC converter circuit which is connected to the antenna, a second AC/DC converter circuit which is connected to the antenna through a first switching element, a first detecting circuit which controls operation of the first switching element in accordance with the value of a voltage output from the first AC/DC converter circuit, a battery which stores electric power supplied from the antenna through the second AC/DC converter circuit, a second detecting circuit which controls a second switching element and a third switching element in accordance with the value of the voltage output from the first AC/DC converter circuit, and a logic circuit to which electric power supplied from the antenna through the first AC/DC converter circuit and the second switching element and electric power supplied from the battery through the third switching element is supplied.

Another aspect of the present invention is a semiconductor device that includes an antenna, a first AC/DC converter circuit which is connected to the antenna, a second AC/DC converter circuit which is connected to the antenna through a first switching element, a first detecting circuit which controls operation of the first switching element in accordance with the value of a voltage output from the first AC/DC converter circuit, a battery which stores electric power supplied from the antenna through the second AC/DC converter circuit, a constant voltage circuit which is connected to the first AC/DC converter circuit and is connected to the battery through a second switching element, and a second detecting circuit which controls operation of the second switching element in accordance with the value of a voltage output from the constant voltage circuit.

Further, according to the semiconductor device of the present invention, in the above-described structure, the battery is electrically connected to the second AC/DC converter circuit through a charge controller circuit.

Another aspect of the present invention is a semiconductor device that includes an antenna, a first AC/DC converter circuit which is connected to the antenna, a second AC/DC converter circuit which is connected to the antenna through a first switching element, a second switching element which is connected to the antenna through an electrical element, a battery which is electrically connected to the second AC/DC converter circuit through a charge controller circuit and stores electric power supplied from the antenna, a first detecting circuit which controls operation of the first switching element in accordance with the value of a voltage output from the first AC/DC converter circuit and controls operation of the second switching element in accordance with the voltage output from the first AC/DC converter circuit and the charging state of the battery, a third switching element which is connected to the battery, and a second detecting circuit which controls operation of the third switching element in accordance with the voltage output from the first AC/DC converter circuit.

Note that being "connected" in this specification means being "electrically connected".

Note that, in the present invention, as a transistor, a transistor of any mode can be used. Therefore, there are no particular limitations on the kind of a transistor. Thus, a thin film transistor (TFT) including a non-single crystalline semiconductor film typified by non-crystalline silicon or polycrystalline silicon can be used. Alternatively, a transistor fowled using a semiconductor substrate or an SOI substrate, a MOS transistor, a junction type transistor, a bipolar transistor, a transistor including a compound semiconductor such as ZnO or a-InGaZnO, a transistor including an organic semiconductor or a carbon nanotube, or another transistor can be used. Note that the non-single crystalline semiconductor film may contain hydrogen or halogen. Further, there are no particular limitations on the kind of a substrate for which a transistor is provided, and various substrates can be used. Therefore, for example, a transistor can be provided for a single crystalline substrate, an SOI substrate, a glass substrate, a quartz substrate, a plastic substrate, a paper substrate, a cellophane substrate, a stone substrate, or the like. Further, a transistor may be formed over a substrate, and then the transistor may be transferred to another substrate.

Further, by forming all of a plurality of circuits over the same substrate, the number of component parts can be reduced to reduce cost, and the number of connections to the other circuit components can be reduced to improve reliability. Alternatively, part of the circuits may be formed over a substrate and the other part of the circuits may be formed over another substrate. That is, not all of the circuits are required to be formed over the same substrate. For example, part of the circuits may be formed with transistors over a glass substrate, and the other part of the circuits may be formed using a single crystalline substrate and an IC chip thereof may be connected by COG (Chip On Glass) so as to be disposed over the glass substrate. Alternatively, the IC chip may be connected to the glass substrate by TAB (Tape Automated Bonding) or a printed wiring board. In this manner, by fowling part of the circuits over the same substrate, for example, the number of component parts can be reduced to reduce cost, and the number of connections between the circuits and the component parts can be reduced to improve reliability. In addition, by forming a portion with a high driving voltage or a portion with high driving frequency over a different substrate, increase of power consumption can be prevented.

As a structure of a transistor usable for a data carrier, a multi-gate structure including two or more gates may be employed. With the multi-gate structure, off-current can be reduced, reliability can be improved by increasing the withstand voltage of the transistor, and a source-drain current is not changed so much even if a source-drain voltage is changed when operating in the saturation region so that flat characteristics can be achieved. Further, a structure in which gate electrodes are provided above and below a channel may also be employed. By employing the structure in which gate electrodes are provided above and below a channel, a channel region is increased, so that a current value can be increased and an S factor can be reduced because a depletion layer is easily formed. Further, any structure of the following may also be employed: a structure in which a gate electrode is disposed above a channel; a structure in which a gate electrode is disposed below a channel; a staggered structure; and an inversely staggered structure. A channel region may be divided into a plurality of regions, and the divided channel regions may be connected in parallel or in series. Further, a source or drain electrode may be overlapped with a channel region (or a part thereof). By employing the structure in which a source or drain electrode is overlapped with a channel region (or a part thereof), operational instability due to charge accumulation in part of a channel can be prevented. Further, an LDD region may also be provided in a source or drain region. By provision of an LDD region, off-current can be reduced, reliability can be improved by increasing the withstand voltage of the transistor, and a source-chain current is not changed so much even if a source-drain voltage is changed when operating in the saturation region so that flat characteristics can be achieved.

By using the present invention, even in the case where the communication distance is extremely short and a large amount of electric power is supplied to a semiconductor device, a defect which would occur in the semiconductor device is prevented, and electric power which is not needed for circuit operation of the semiconductor device (extra electric power) is not wasted but is stored in a battery, whereby effective use of electric power can be achieved.

BRIEF DESCRIPTION OF THE DRAWINGS

FIGS. 14A to 14D are diagrams showing one example of a manufacturing method of a semiconductor device of the present invention.

FIGS. 15A to 15C are diagrams showing one example of a manufacturing method of a semiconductor device of the present invention.

FIGS. 16A and 16B are diagrams showing one example of a manufacturing method of a semiconductor device of the present invention.

FIGS. 17A and 17B are diagrams showing one example of a manufacturing method of a semiconductor device of the present invention.

FIGS. 18A and 18B are diagrams showing one example of a manufacturing method of a semiconductor device of the present invention.

DETAILED DESCRIPTION OF THE INVENTION

Figure 1:
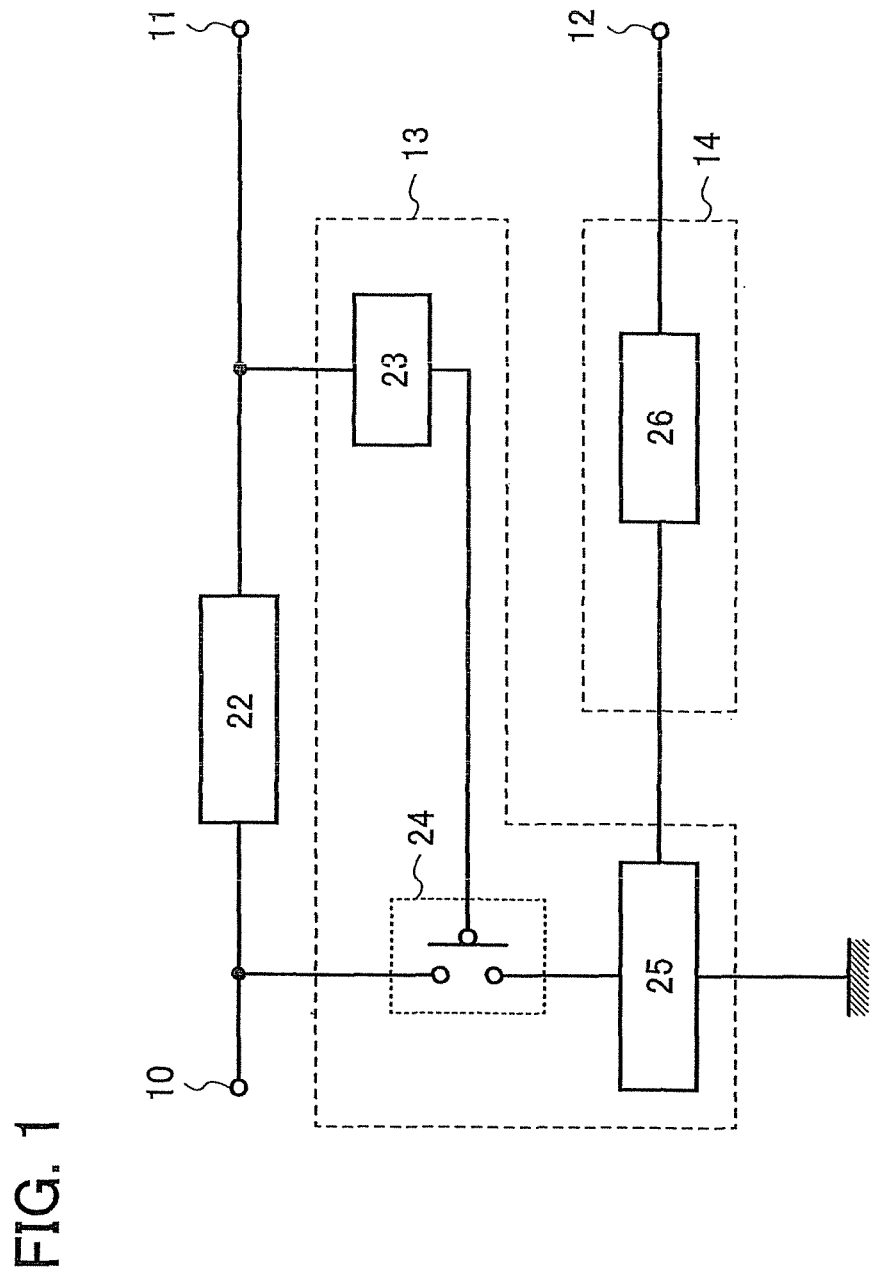
FIG. 1 is a diagram showing one example of the structure of a semiconductor device of the present invention.

Although the present invention will be fully described by way of embodiment modes with reference to the accompanying drawings, it is to be understood that various changes and modifications will be apparent to those skilled in the art. Therefore, unless such changes and modifications depart from the scope of the present invention, they should be construed as being included therein. Through all the drawings for describing the embodiment modes, the same portions may be denoted by the same reference numerals, and description thereof is not repeated.

(Embodiment Mode 1)

In this embodiment mode, one example of a structure and operation of the semiconductor device of the present invention is described using drawings.

A semiconductor device described in this embodiment mode includes an input portion 10; a first DC converter circuit 22; a limiter circuit 13 including a first detecting circuit 23, a switching element 24, and a second DC converter circuit 25; and a charging circuit 14 including a battery 26 (see FIG. 1). A direct-current voltage, after being converted by the first DC converter circuit 22, is output to a first output portion 11, and electric power of the battery 26 is supplied to a circuit connected to an output portion 12.

The input portion 10 can, for example, be connected to an antenna, where electric power received by the antenna is supplied thereto.

The first DC converter circuit 22 converts an alternating-current voltage that is output from the input portion 10 into a direct-current voltage to be output to the first output portion 11 and the limiter circuit 13. The second DC converter circuit 25 converts an alternating-current voltage that is output from the input portion 10 into a direct-current voltage to be output to the charging circuit 14 when the switching element 24 is turned on. Each of the first DC converter circuit 22 and the second DC converter circuit 25 can be formed of a half-wave rectifier, a half-wave double-voltage rectifier, a full-wave rectifier, a Cockcroft circuit, or the like. Note that the first DC converter circuit 22 and the second DC converter circuit 25 can employ either the same structure or different structures. The DC converter circuit herein refers to an AC/DC converter circuit which converts an alternating-current signal into a direct-current signal.

The first detecting circuit 23 has a function of controlling on/off of the switching element 24 by a voltage value of a direct-current voltage output from the first DC converter circuit 22. The first detecting circuit 23 can be formed, for example, of a resistor 61, n-stage diodes 62, a p-channel transistor 63, and an n-channel transistor 64 (see FIG. 5). As each transistor, for example, a thin film transistor (TFT) can be used.

Figure 5:
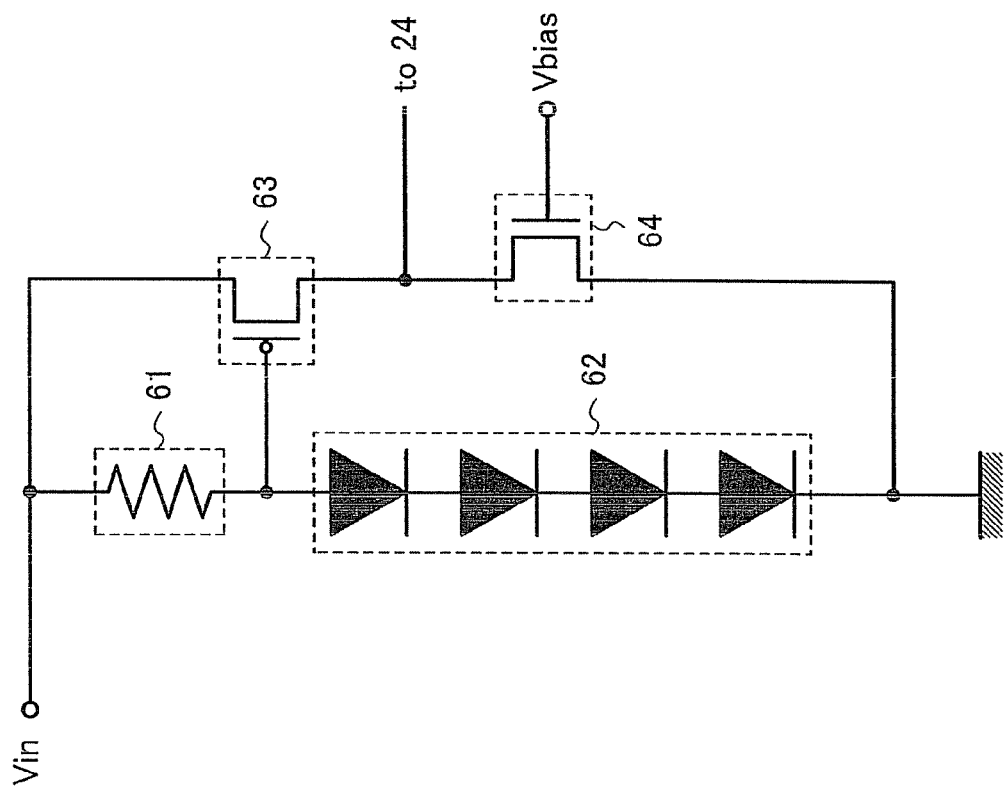
FIG. 5 is a diagram showing one example of the structure of a detecting circuit of a semiconductor device of the present invention.

Next, operation of the first detecting circuit 23 shown in FIG. 5 is described. When a direct-current voltage is applied to a Vin and the n-stage diodes 62 are not turned on, the n-channel transistor 64 is turned on by a Vbias whereas the p-channel transistor 63 is turned off so that a GND potential is supplied to the switching element 24 (an n-channel transistor here), whereby the switching element 24 is turned off and the battery 26 is not charged. When the n-stage diodes 62 are turned on, a current flows through the resistor 61 and a voltage drop occurs so that the gate-source potential of the p-channel transistor 63 comes to be less than zero. When the gate-source potential is greater than or equal to the threshold value of the p-channel transistor 63, the p-channel transistor 63 is turned on, so that the drain-source potential of the n-channel transistor 64 is transmitted to the switching element 24, whereby the switching element 24 is turned on and the battery 26 starts charging.

The above-described detecting circuit 23 is first operated when a potential to turn on all of the n diodes connected in series is applied to the n-stage diodes. That is, an operation start voltage of the detecting circuit is determined by the number of diodes connected in series, the threshold value thereof.

Note that, by provision of the first detecting circuit 23 after the first DC converter circuit 22, the limiter circuit 13 can be operated by an output voltage which is less than the maximum rating of the first DC converter circuit 22 in FIG. 1; however, the first detecting circuit 23 may also be provided at another position.

There are no particular limitations on the switching element 24 as long as the switching element 24 can control electrical connection between the input portion 10 and the second DC converter circuit 25. It is preferable for the switching element 24 that the propagation delay time be short and noise by fast switching be small. For example, the switching element 24 can be formed of a transistor, a thyristor, or the like.

In the present invention, the battery refers to a storage means which can restore continuous operating time by being charged. Note that the storage means includes, in its category, a secondary battery, a capacitor, and the like, and these storage means are generically named a battery in this specification. Note that, as the battery 26, when, for example, a lithium battery, and more preferably, a lithium polymer battery using a gel-like electrolyte, a lithium ion battery, or the like is used, the size can be reduced. Of course, any battery can be used as long as it is a battery that can be charged, and a battery capable of charging and discharging such as a nickel-metal-hydride battery, a nickel-cadmium battery, an organic radical cell, a lead battery, an air secondary battery, a nickel zinc battery, or a silver zinc battery, or a capacitor having large capacity or the like may be used as well.

Note that, as for the large capacity capacitor which can be used as the battery of the present invention, it is preferable that the opposed area of electrodes thereof be large. It is preferable to use a double-layer electrolytic capacitor formed using an electrode material having a large specific surface area, such as activated carbon, fullerene, or a carbon nanotube. A capacitor has a simpler structure and is easily formed to be thin and is easily stacked as compared to a battery. The double-layer electrolytic capacitor is preferable because it has a function of storing electric power, does not deteriorate so much even when the number of times of charging and discharging is increased, and has an excellent rapid charging property.

Further, an integrated circuit or the like may be connected to the first output portion 11 or the second output portion 12.

Although the second DC converter circuit 25 is provided in the limiter circuit 13 in FIG. 1, the second DC converter circuit 25 may be provided in the charging circuit 14, as well.

Next, operation of the semiconductor device in this embodiment mode is described.

First, an alternating-current voltage is input to the input portion 10 from outside, and the first DC converter circuit 22 converts the alternating-current voltage into a direct-current voltage and inputs to the first detecting circuit 23. In the case where the direct-current voltage input to the first detecting circuit 23 is less than a constant voltage value (Vx), the switching element 24 is maintained at the OFF state (the state in which the input portion 10 and the second DC converter circuit 25 are electrically isolated from each other) so that the direct-current voltage is not supplied to the second DC converter circuit 25. As a result, the alternating-current voltage input to the input portion 10 is supplied to a first output portion after being converted from the alternating-current voltage into the direct-current voltage.

On the other hand, in the case where the direct-current voltage input to the first detecting circuit 23 is greater than or equal to the constant voltage value (Vx), a voltage is applied to the switching element 24 to turn the switching element 24 on (the state in which the input portion 10 and the second DC converter circuit 25 are electrically connected to each other). As a result, the alternating-current voltage input to the input portion 10 is supplied to the first output portion 11 after being converted into the direct-current voltage, and supplied to the battery 26 provided in the charging circuit 14 after being converted into the direct-current voltage by the second DC converter circuit 25 through the switching element 24.

There is a correlation between alternating-current voltage input to the input portion 10 and direct-current voltage output from the first DC converter circuit 22; as the alternating-current voltage input to the input portion 10 increases, the output voltage of the first DC converter circuit 22 increases. Since a voltage output from the first DC converter circuit 22 which is higher than a certain value may destroy circuits including the first DC converter circuit 22 connected to the first output portion 11, the limiter circuit 13 is provided such that when a high alternating-current voltage is supplied to the input portion 10, the high alternating-current voltage is supplied to the charging circuit 14.

Further, at the time of charging, by controlling an impedance Z1 where the first DC converter circuit 22 and the circuit connected to the first output portion 11 are connected in series and an impedance Z2 where the second DC converter circuit 25 and the battery 26 are connected in series, the ratio of supply electric power between the circuit connected to the first output portion 11 and the battery 26 can be adjusted. Controlling of the impedance Z1 and the impedance Z2 depends on the size of the first DC converter circuit 22 and the second DC converter circuit 25; therefore, the values of the impedance Z1 and the impedance Z2 can be controlled as appropriate by the size of the first DC converter circuit 22 and the second DC converter circuit 25 being set as selected.

Figure 2:
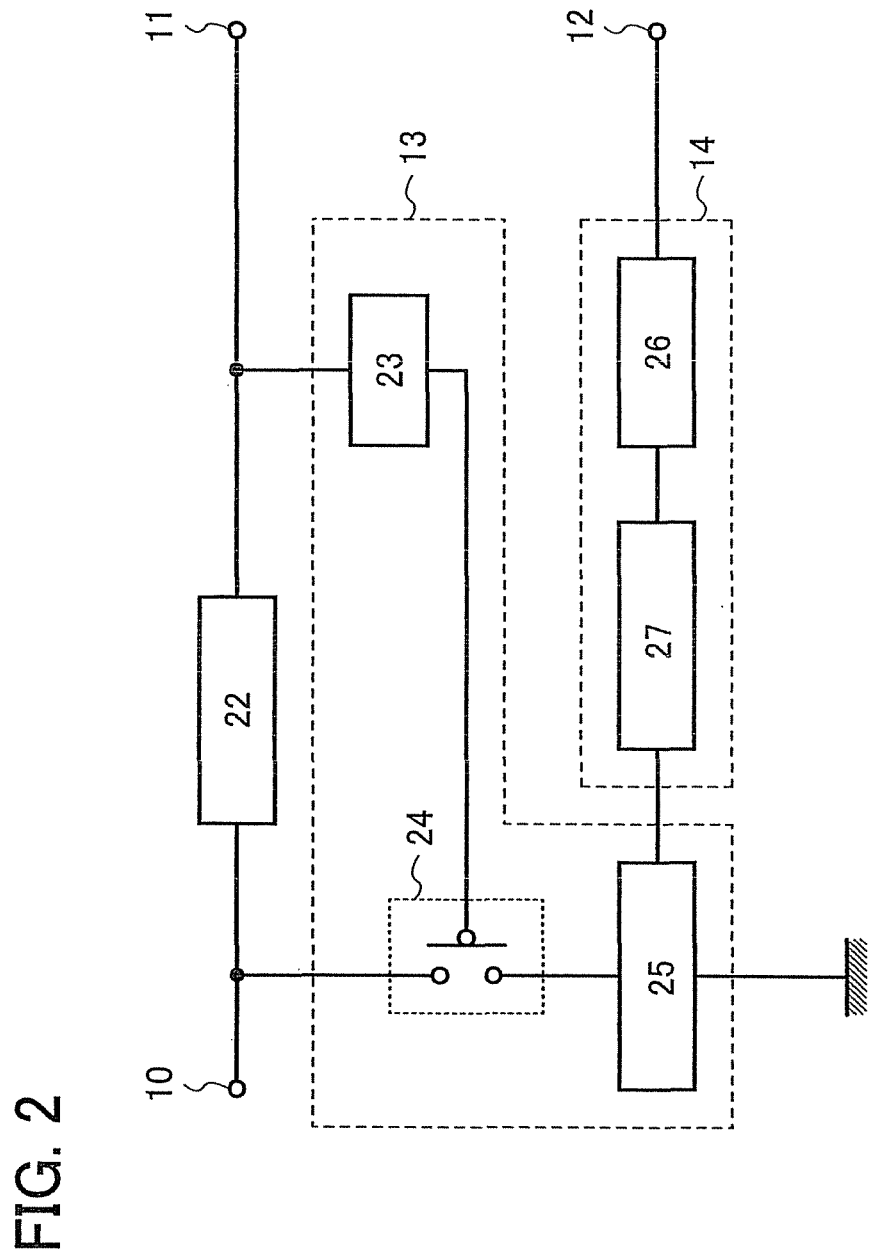
FIG. 2 is a diagram showing one example of the structure of a semiconductor device of the present invention.

Further, a charge controller circuit 27 may be provided in the charging circuit 14 so that charging of the battery 26 is controlled (see FIG. 2).

As described above, in the state where the battery 26 can be charged, the switching element 24 is turned on by operation of the limiter circuit 13, and an alternating-current voltage is supplied to the battery 26 after being input to the input portion 10. However, if the battery 26 has been charged enough, a defect may occur in the battery 26 due to overcharging. Therefore, by provision of the charge controller circuit 27, destruction of the battery 26 due to overcharging can be prevented.

There are no particular limitations on the charge controller circuit 27 which functions as a protection circuit for the battery 26 as long as it is one that detects the overcharging and heat generation of the battery 26 and has a function of shutdowning a current source or voltage source in the case of abnormal. Further, it is preferable that the charge controller circuit 27 be formed of a circuit by which a suitable charge mode of the battery 26 can be selected. For example, as a battery charge mode, there are -$\Delta$V charge, timer charge, constant-voltage constant-current charge, $\Delta T/\Delta t$ detection, and the like. The battery 26 has characteristics in which the volume energy density is decreased due to overcharging; therefore, it is necessary to select the suitable charge mode of the battery 26.

Figure 11A:
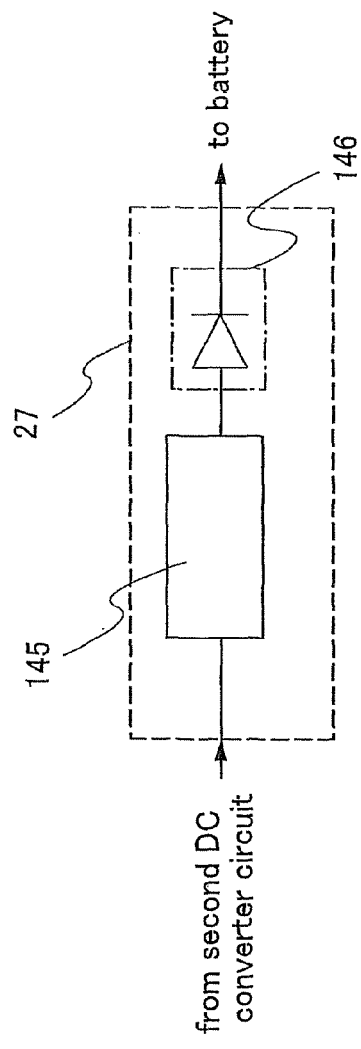
FIGS. 11A and 11B are diagrams each showing one example of the structure of a charge controller circuit of a semiconductor device of the present invention.
Figure 11B:
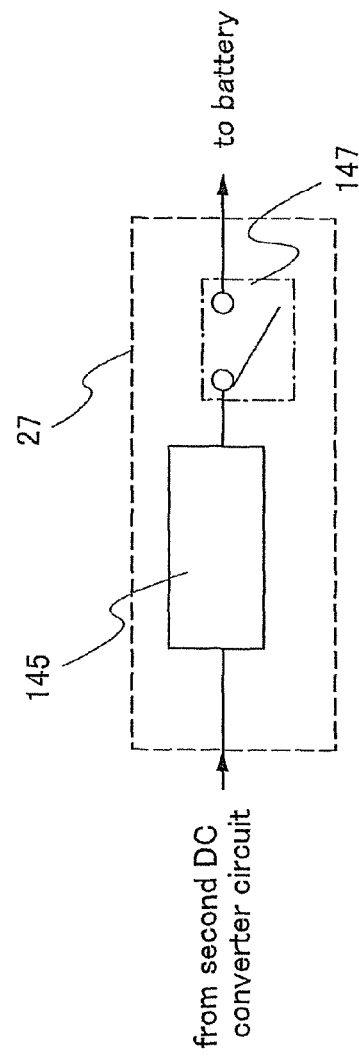

There are no particular limitations on the charge controller circuit 27 shown in FIG. 2 as long as it is a circuit that controls the voltage level of an electrical signal input from the second DC converter circuit 25 and outputs to the battery 26. For example, as shown in FIG. 11A, the charge controller circuit 27 can be formed of a regulator 145 that is a circuit for controlling a voltage and a diode 146 having a rectifying property. The diode 146 prevents leakage of electric power which has been stored in the battery 26. Therefore, as shown in FIG. 11B, the diode 146 can be replaced with a switch 147. The switch 147 is turned on in the state of charging the battery 26 and turned off in the state of stopping charging, whereby leakage of electric power which has been stored in the battery 26 can be prevented.

Figure 12:
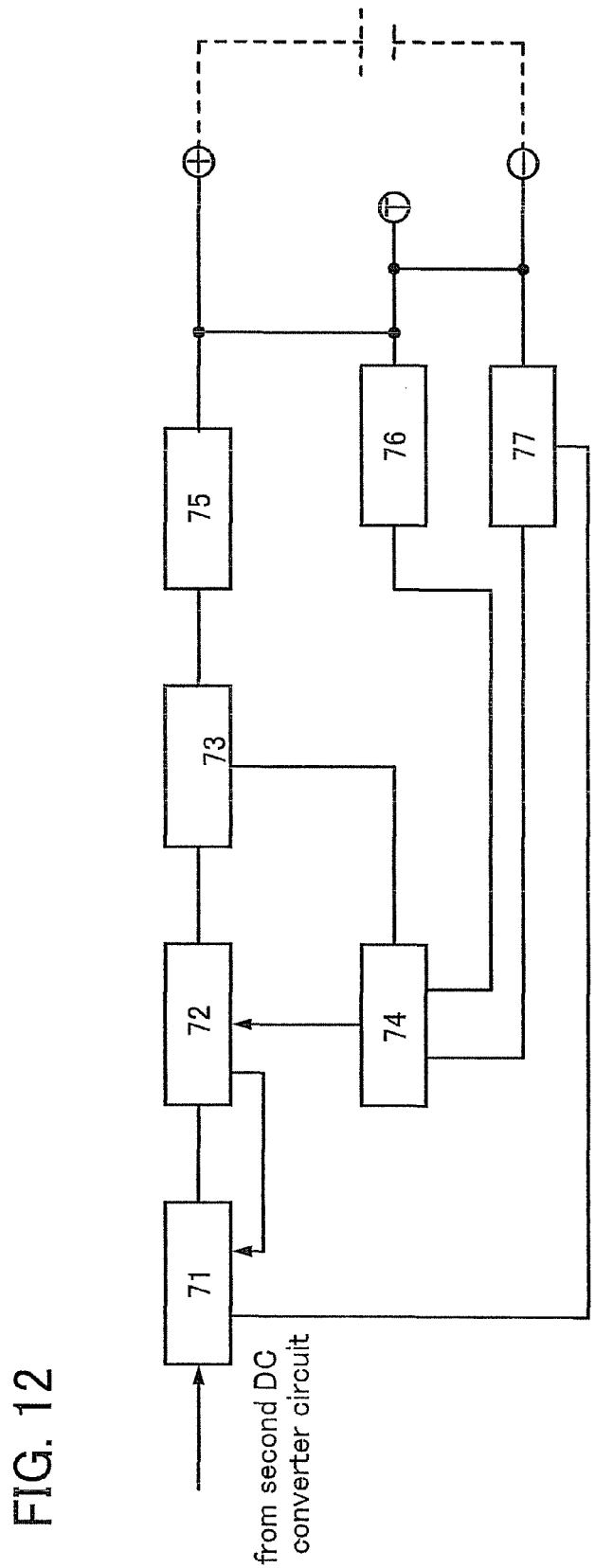
FIG. 12 is a diagram showing one example of the structure of a charge controller circuit of a semiconductor device of the present invention.

Note that the structure of the charge controller circuit 27 is not limited to one example, and various functions for protecting the battery 26 may be provided (see FIG. 12). For example, a power supply portion 71, an output current controller 72, an output voltage controller 73, a charge controller 74, a reverse-current prevention portion 75, a buttery connection detecting portion 76, and a temperature detection portion 77 may also be provided.

The reverse-current prevention portion 75 in FIG. 12 prevents electric power from being discharged from the battery 26 via the second DC converter circuit 25 when electric power supplied via the second DC converter circuit 25 is blocked. As the reverse-current prevention portion 75, a Schottky Barrier Diode is typically used but a transistor or a relay may also be used. As the reverse-current prevention portion 75, a low-loss switch is preferably used regardless of whether a transistor or a diode is used.

The temperature detecting portion 77 in FIG. 12 is formed of a thermistor and is used in detecting the temperature of a battery at the time the battery is rapidly being charged. Further, the following can also be detected: whether the temperature of the battery is within the rated temperature range; an effect due to heat generated from a battery peripheral circuit; heat generation due to charge when the battery has an internal short-circuit; or the like.

In the temperature detecting portion 77 in the charge controller circuit described in this embodiment mode, a thermistor which is characteristic in that the electrical resistance greatly changes with respect to a change in temperature is used, and the temperature is detected by a change in a voltage or current. Note that the temperature detecting portion 77 has a function of detecting the following: the temperature of a battery at the time the battery is rapidly being charged; an effect due to heat generated from a battery peripheral circuit; heat generation due to charge when the battery has an internal short-circuit; or the like.

As the thermistor included in the temperature detecting portion 77 in FIG. 12, a thermistor operated within a temperature range of −1° C. to +1° C. is generally used; and there are no particular limitations on a material of the thermistor as long as the thermistor can be used as usage, such as an NTC thermistor, a PTC thermistor, a CTR thermistor, or the like.

As described above, by provision of the first DC converter circuit 22 and the second DC converter circuit 25 and controlling the supply destination of electric power supplied from outside, the battery can be charged while the first DC converter circuit 22 is protected, whereby electric power can be utilized effectively.

This embodiment mode can be implemented in combination with the structure of any semiconductor device described in any other embodiment mode in this specification.

(Embodiment Mode 2)

In this embodiment mode, the case where the semiconductor device of the present invention is provided as a wireless tag (also called an RFID (Radio Frequency Identification) tag, an IC (Integrated Circuit) tag, an IC chip, an RF tag, or an electronic tag) which can communicate data wirelessly is described using drawings.

Figure 3:
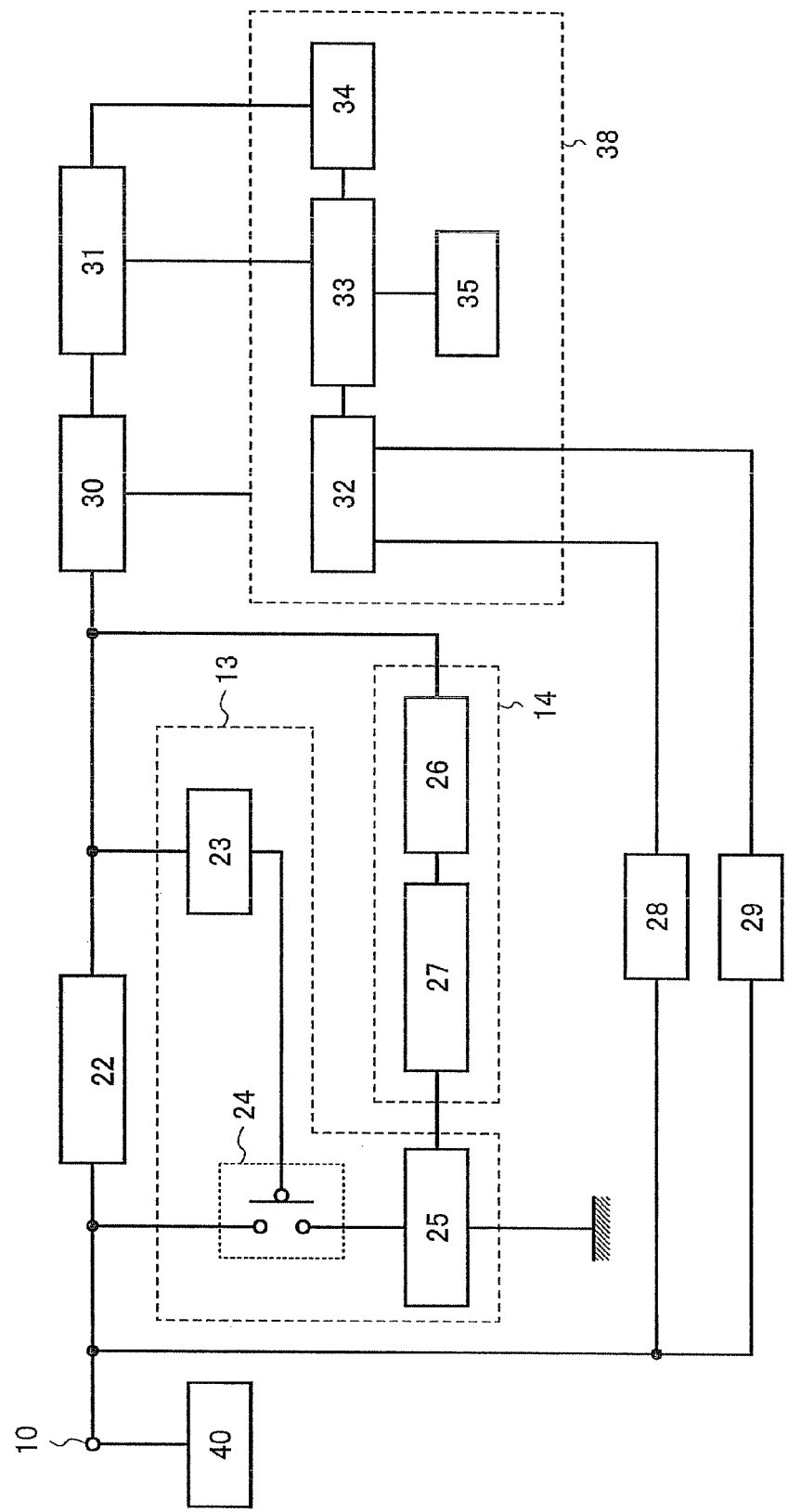
FIG. 3 is a diagram showing one example of the structure of a semiconductor device of the present invention.

A semiconductor device described in this embodiment mode includes an antenna 40; the first DC converter circuit 22; the limiter circuit 13; the charging circuit 14; a modulating circuit 28 which modulates encoded data; a demodulating circuit 29 which digitalizes a signal received from the antenna 40; a constant voltage circuit 30 which makes an output voltage of the first DC converter circuit 22 a constant voltage; a clock generating circuit 31; an encoding circuit 32; a controller circuit 33; a judging circuit 34; and a memory 35 (see FIG. 3). Note that the limiter circuit 13 includes the first detecting circuit 23, the switching element 24, and the second DC converter circuit 25, and the charging circuit 14 includes the battery 26 and the charge controller circuit 27. Further, a circuit including the encoding circuit 32, the controller circuit 33, the judging circuit 34, and the memory 35 is called a logic circuit 38, and a constant voltage is supplied from the constant voltage circuit 30 to the logic circuit 38.

The semiconductor device described in this embodiment mode may be utilized as a wireless tag or a wireless chip.

Figure 4:
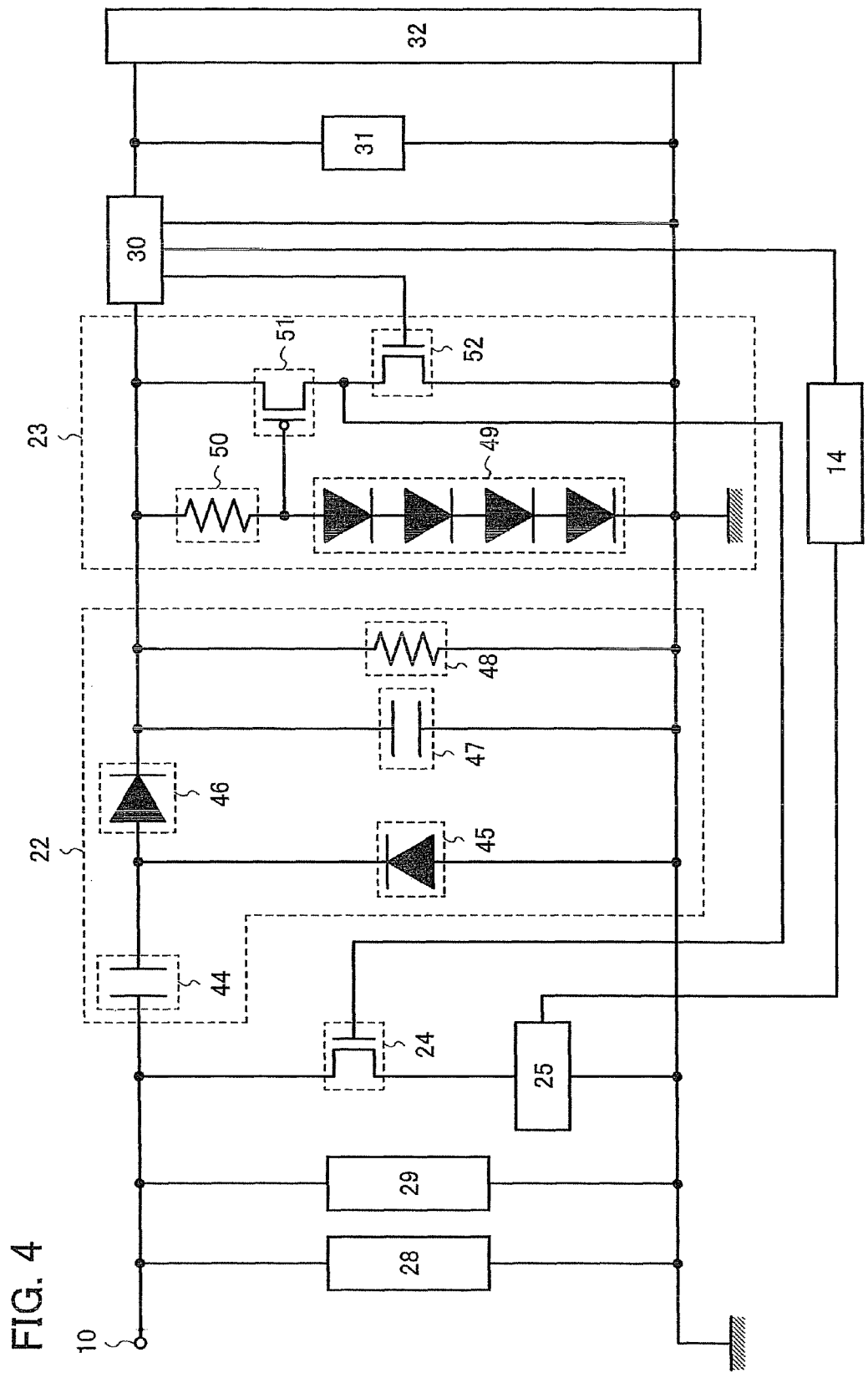
FIG. 4 is a diagram showing one example of the structure of a semiconductor device of the present invention.

A more specific structure of FIG. 3 is shown in FIG. 4.

The mode shown in FIG. 4 is the same as that shown in FIG. 3. The first detecting circuit 23 includes 4-stage diodes 49, a resistor 50, a p-channel transistor 51, and an n-channel transistor 52, and the first DC converter circuit 22 includes a capacitor 44, a diode 45, a diode 46, a capacitor 47, and a resistor 48 (see FIG. 4). There are no particular limitations on the switching element 24 as long as it controls electrical connection between the input portion 10 and the second DC converter circuit 25; for description of operation, in this embodiment mode, the switching element 24 is formed of an n-channel transistor in FIG. 4.

Next, operation of a wireless tag from receiving an instruction wirelessly from a reader/writer to making a response to the reader/writer wirelessly is described using FIG. 4.

An instruction transmitted from the reader/writer can be divided into a carrier wave and an instruction signal. The carrier wave is used as a power supply voltage for operating the wireless tag and the instruction signal is analyzed in the logic circuit 38. Specifically, first, electric power is received by the antenna 40, an alternating-current voltage output from the input portion 10 is converted into a direct-current voltage by the first DC converter circuit 22 and is supplied to the constant voltage circuit 30. Then, the constant voltage circuit 30 generates power supply voltages for the clock generating circuit 31 and the logic circuit 38. An instruction signal transmitted from the reader/writer, which has been encoded, is digitalized by the demodulating circuit 29. The digitalized data is judged whether it has been received normally in the judging circuit 34, and data which has been stored in the memory 35 is extracted by the controller circuit 33. Then, a response signal from the tag is encoded by the encoding circuit 32, and load modulation of the encoded signal is performed by the modulating circuit 28 to transmit the response signal to the reader/writer.

An operation principle of the first detecting circuit 23 is described. When an output voltage from the first DC converter circuit 22 is low and the 4-stage diodes 49 are not turned on, the first detecting circuit 23 does not operate. When the output voltage from the first DC converter circuit 22 becomes high and the 4-stage diodes 49 are turned on, a current flows through the resistor 50 and a gate-source voltage of the p-channel transistor 51 is generated so that the p-channel transistor 51 is turned on. After that, a voltage is applied to a gate of the n-channel transistor which functions as the switching element 24 to turn the n-channel transistor on, and an alternating-current voltage output from the input portion 10 is converted into a direct-current voltage by the second DC converter circuit 25. The direct-current voltage charges the charging circuit 14 after being converted by the second DC converter circuit 25.

Further, a voltage output from either the first DC converter circuit 22 or the battery 26 is adjusted to be a constant voltage by the constant voltage circuit 30 and then output to the clock generating circuit 31 and the logic circuit 38. The constant voltage circuit 30 includes a reference circuit and a differential amplifier circuit. A reference voltage generated by the reference circuit is compared with the voltage input to the constant voltage circuit 30 by the differential amplifier circuit, whereby the constant voltage is generated.

Figure 13A:
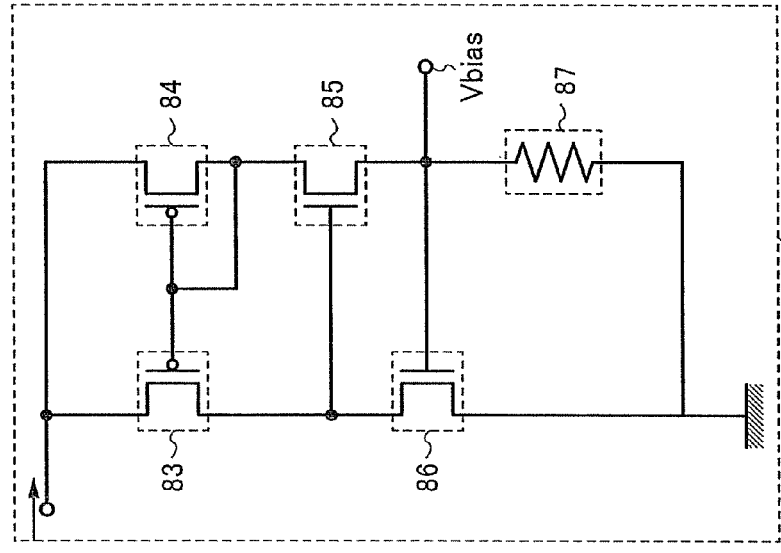
FIGS. 13A and 13B are diagrams each showing one example of the structure of a detecting circuit of a semiconductor device of the present invention.

A reference circuit 81 includes a current mirror circuit including a p-channel transistor 83 and a p-channel transistor 84, an n-channel transistor 85, an n-channel transistor 86, and a resistor 87 (see FIG. 13A). A differential amplifier circuit 82 includes a current mirror circuit including a p-channel transistor 89 and a p-channel transistor 90, an n-channel transistor 91, a p-channel transistor 92, a p-channel transistor 93, an n-channel transistor 94, an n-channel transistor 95, an n-channel transistor 96, a capacitor 97, and a capacitor 98 (see FIG. 13B).

An operation principle of the reference circuit 81 is described below. A direct-current voltage is applied to a Vin, and when the gate-source potential of each of the p-channel transistor 83 and the p-channel transistor 84 is greater than or equal to the threshold value, the p-channel transistor 83 and the p-channel transistor 84 are turned on After that, the gate potential of the n-channel transistor 85 is increased, and when Vgs thereof becomes equal to or larger than the threshold value, the n-channel transistor 85 is turned on. Then, a current flows through the resistor 87, and a voltage drop occurs in the resistor 87. When the voltage value of the resistor 87 is equal to or larger than the threshold value of the n-channel transistor 86, the n-channel transistor 86 is turned on. The reference circuit is provided with the current mirror circuit which is a constant current circuit, and the same current flows into the p-channel transistor 83 and the p-channel transistor 84. By the above-described operation principle, a reference voltage for comparison of the differential amplifier circuit 82 is generated as a Vbias.

An operation principle of the differential amplifier circuit 82 is described below. The p-channel transistor 89 and the p-channel transistor 90 are turned on when the gate-source voltage of each of the p-channel transistor 89 and the p-channel transistor 90 becomes less than the threshold value. When the p-channel transistor 89 is turned on, a potential difference occurs between source and drain of the p-channel transistor 89 because the n-channel transistor 91 is turned on when the gate-source potential thereof is greater than or equal to the threshold value. Therefore, the p-channel transistor 92 is turned on, and a voltage occurs as a Vdd. The p-channel transistor 93 and the n-channel transistor 94 are diode-connected. The differential amplifier circuit 82 operates such that gate nodes of the p-channel transistor 93 and the n-channel transistor 94 have the same voltage as the Vbias supplied from the reference circuit.

Through the operation of the reference circuit 81 and the differential amplifier circuit 82, a voltage is stabilized after being input to the constant voltage circuit 30.

As examples of the memory 35, there are an EEPROM and an FeRAM which can store data for a long period of time without any electric power being supplied; considering the writing speed, the writing voltage, the writing energy, and the like, an FeRAM is more practical.

As each of the diodes 45, 46, and 49, an n-channel transistor whose gate node and drain node are connected together may also be used instead of a diode element.

The shape of the antenna 40 may be selected in accordance with a communication system. The wireless tag described in this embodiment mode can perform communication by an electromagnetic induction type or a radio wave type.

It is an object of the above-described load modulation to encrypt data by changing the reflectance or phase of data transmitted from the antenna depending on the terminal or connection state of the antenna. The load modulation includes in its category resistive load modulation and capacitive load modulation.

The above-described wireless tag responds to an ASK modulation system, an FSK modulation system, and a PSK modulation system. The ASK modulation system changes the amplitude of a signal to be transmitted. In 100% ASK modulation, "0" means oscillation is stopped and "1" means oscillation is begun. The FSK modulation system changes the frequency of a signal to be transmitted. The PSK modulation system changes the phase of a signal to be transmitted.

The semiconductor device of the present invention protects the first DC converter circuit 22 by provision of the charging circuit 14 at a position shown in FIG. 3 so that extra electric power charges the battery. In addition, by supplying a charged voltage to the constant voltage circuit 30, long-distance response which has never before been realized can be realized.

This embodiment mode can be implemented in combination with the structure of any semiconductor device described in any other embodiment mode in this specification.

(Embodiment Mode 3)

A semiconductor device described in this embodiment mode includes the first DC converter circuit 22; the limiter circuit 13; the charging circuit 14; a first constant voltage circuit 54; a second constant voltage circuit 55; and a first discharge controller circuit 201. Note that the limiter circuit 13 includes the first detecting circuit 23, the switching element 24, and the second DC converter circuit 25, the charging circuit 14 includes the battery 26, and the first discharge controller circuit 201 includes a second detecting circuit 43, a switching element 56, a switching element 57, and the buffer 36 (see FIG. 6).

Operation of the semiconductor device described in this embodiment mode is described below. Note that, in the description hereinafter, when the first discharge controller circuit 201 does not operate, the switching element 56 is maintained at the ON state and the switching element 57 is maintained at the OPP state.

First, an alternating-current voltage is input to the input portion 10 from outside, and the first DC converter circuit 22 converts the alternating-current voltage into a direct-current voltage and inputs to the first detecting circuit 23. In the case where the direct-current voltage input to the first detecting circuit 23 is less than a constant voltage value (Vx), the switching element 24 is maintained at the OPE state (the state in which the input portion 10 and the second DC converter circuit 25 are electrically isolated from each other) so that the direct-current voltage is not supplied to the second DC converter circuit 25. As a result, the alternating-current voltage input to the input portion 10 is supplied to the first constant voltage circuit 54 after being converted into the direct-current voltage by the first DC converter circuit 22. During the period in which the first discharge controller circuit 201 is not operated, the switching element 56 is turned on, whereby an output voltage of the first constant voltage circuit 54 is applied to a third output portion 15. Note that, as for the alternating-current voltage to be input to the input portion 10, an alternating-current voltage obtained by connecting the input portion 10 to an antenna can be used, for example.

On the other hand, in the case where the direct-current voltage input to the first detecting circuit 23 is greater than or equal to the constant voltage value (Vx), the switching element 24 is turned on (the state in which the input portion 10 and the second DC converter circuit 25 are electrically connected to each other). As a result, the alternating-current voltage input to the input portion 10 is supplied to the first constant voltage circuit 54 after being converted into the direct-current voltage by the first DC converter circuit 22, and supplied to the battery 26 provided in the charging circuit 14 after being converted into the direct-current voltage by the second DC converter circuit 25 through the switching element 24. During the period in which the first discharge controller circuit 201 is not operated, the switching element 56 is turned on and the switching element 57 is turned off, whereby the first constant voltage circuit 54 supplies a constant voltage to the third output portion 15 and a charging voltage of the charging circuit 14 is not supplied to the second constant voltage circuit 55.

There is a correlation between alternating-current voltage input to the input portion 10 and direct-current voltage output from the first DC converter circuit 22; as the alternating-current voltage input to the input portion 10 increases, the output voltage of the first DC converter circuit 22 increases. Since a voltage output from the first DC converter circuit 22 which is higher than a certain value may destroy circuits including the first DC converter circuit 22 connected to the first output portion 11, the limiter circuit 13 is provided such that when a high alternating-current voltage is supplied to the input portion 10, the high alternating-current voltage is supplied to the charging circuit 14.

When the alternating-current voltage input to the input portion 10 is decreased, and a voltage output from the first constant voltage circuit 54 is detected by the second detecting circuit 43 and upon reaching a voltage (less than or equal to Vy) at which the first discharge controller circuit 201 is operated, the switching element 56 is turned off and the switching element 57 is turned on; therefore, the output voltage of the first constant voltage circuit 54 is not applied to the third output portion 15. On the other hand, the charging voltage of the charging circuit 14 is supplied to the second constant voltage circuit 55. Accordingly, only an output voltage of the second constant voltage circuit 55 is applied to the third output portion 15.

The first DC converter circuit 22 converts an alternating-current voltage that is input from the input portion 10 into a direct-current voltage to be output to the first constant voltage circuit 54 and the limiter circuit 13. The second DC converter circuit 25 converts an alternating-current voltage that is input from the input portion 10 into a direct-current voltage to be output to the charging circuit 14 when the switching element 24 is turned on. Each of the first DC converter circuit 22 and the second DC converter circuit 25 can be formed of a half-wave rectifier, a half-wave double-voltage rectifier, a full-wave rectifier, a Cockcroft circuit, or the like. Note that the first DC converter circuit 22 and the second DC converter circuit 25 can employ either the same structure or different structures.

Figure 6:
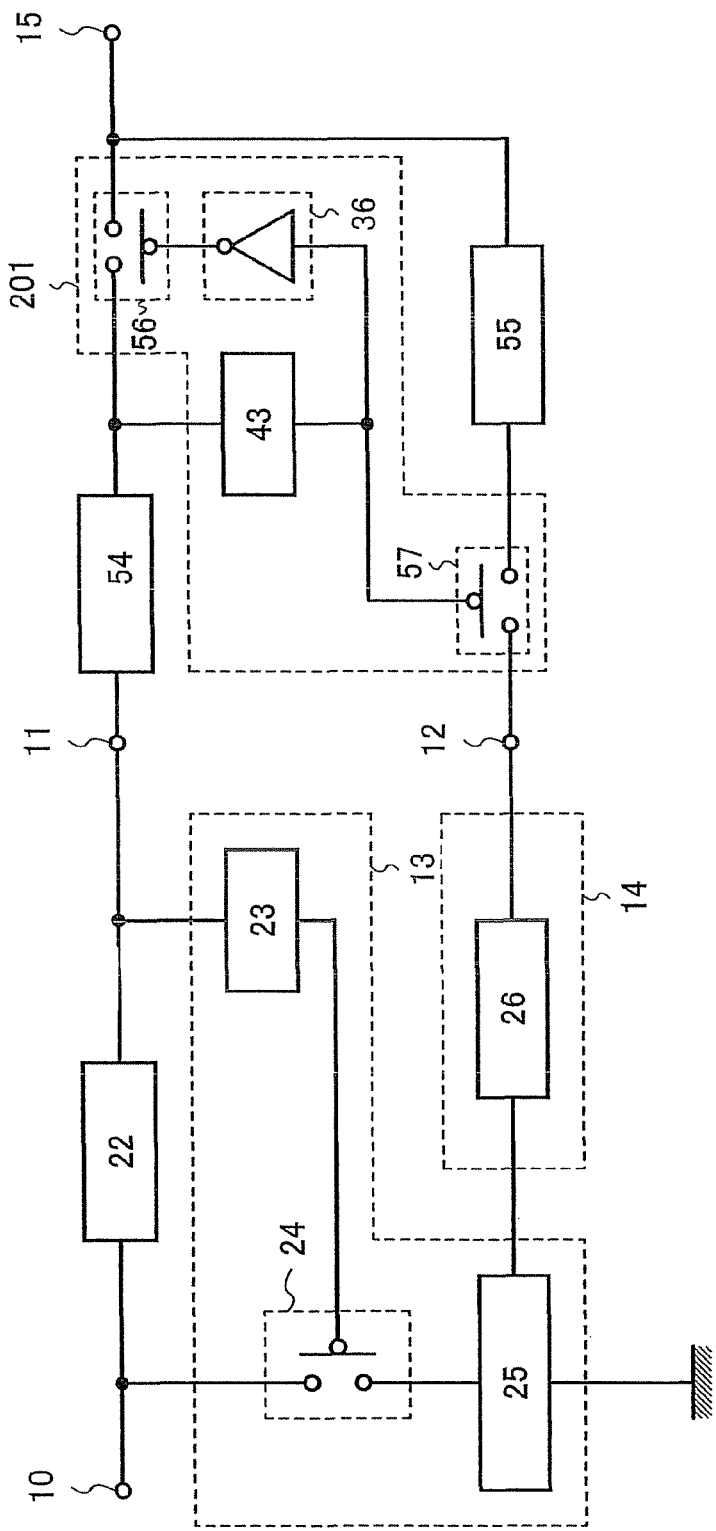
FIG. 6 is a diagram showing one example of the structure of a semiconductor device of the present invention.

Note that, by provision of the first detecting circuit 23 after the first DC converter circuit 22, the limiter circuit 13 can be operated by an output voltage which is less than the maximum rating of the first DC converter circuit 22 in FIG. 6; however, the first detecting circuit 23 may also be provided at another position.

Further, the third output portion 15 can be connected to an integrated circuit such as the above-described logic circuit or clock generating circuit or to a load which needs a power source.

Although the second DC converter circuit 25 is provided in the limiter circuit 13 in FIG. 6, the second DC converter circuit 25 may be provided in the charging circuit 14, as well.

Respective positions of the second detecting circuit 43, the buffer 36, the switching element 56, and the switching element 57 are not limited to the positions described in this embodiment mode; and connection as usage is preferable. For example, the second detecting circuit 43 may be provided at an output of the first DC converter circuit 22 instead of at an output of the first constant voltage circuit 54. The buffer 36 may be provided at an input of the switching element 57 instead of at an input of the switching element 56. The switching element 56 may be provided at an input of the first constant voltage circuit 54 instead of at the output of the first constant voltage circuit 54. The switching element 57 may be provided at an output of the second constant voltage circuit 55 instead of at an output of the charging circuit 14.

Figure 13B:
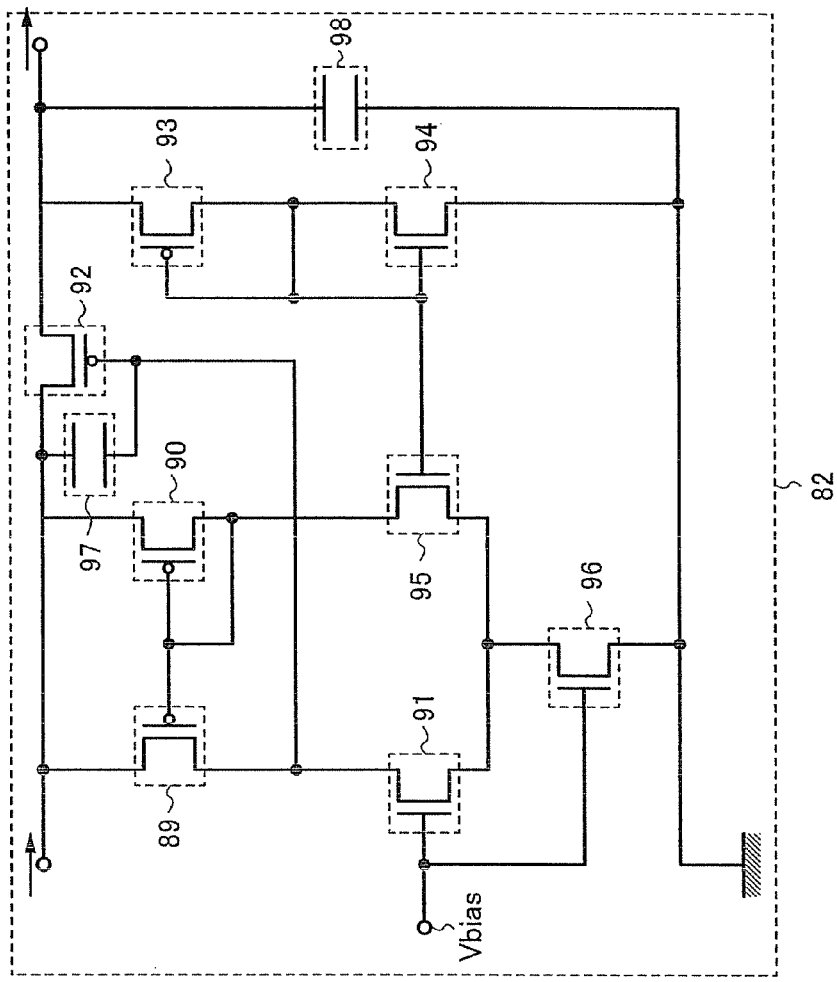

The first constant voltage circuit 54 and the second constant voltage circuit 55 may each include the reference circuit 81 and the differential amplifier circuit 82 described in the above embodiment mode (see FIGS. 13A and 13B).

The first constant voltage circuit 54 and the second constant voltage circuit 55 can employ either the same structure or different structures.

Further, at the time of charging, by controlling an impedance Z1 where the first DC converter circuit 22 and the circuit connected to the first output portion 11 are connected in series and an impedance Z2 where the second DC converter circuit 25 and the battery 26 are connected in series, the ratio of supply electric power between the circuit connected to the first output portion 11 and the battery 26 can be adjusted. Controlling of the impedance Z1 and the impedance Z2 depends on the size of the first DC converter circuit 22 and the second DC converter circuit 25; therefore, the values of the impedance Z1 and the impedance Z2 can be controlled as appropriate by the size of the first DC converter circuit 22 and the second DC converter circuit 25 being set as selected.

Further, the charge controller circuit 27 may be provided in the charging circuit 14 so that charging of the battery 26 is controlled.

As described above, by adding the first constant voltage circuit 54, the second constant voltage circuit 55, and the first discharge controller circuit 201 to the semiconductor device of Embodiment Mode 1, the battery can be charged while the first DC converter circuit 22 is protected, and a use cycle of the charging voltage of the charging circuit 14 can be determined. Further, interference of the first constant voltage circuit and the second constant voltage circuit can be prevented by provision of two constant voltage circuits.

This embodiment mode can be implemented in combination with the structure of any semiconductor device described in any other embodiment mode in this specification.

(Embodiment Mode 4)

Figure 7:
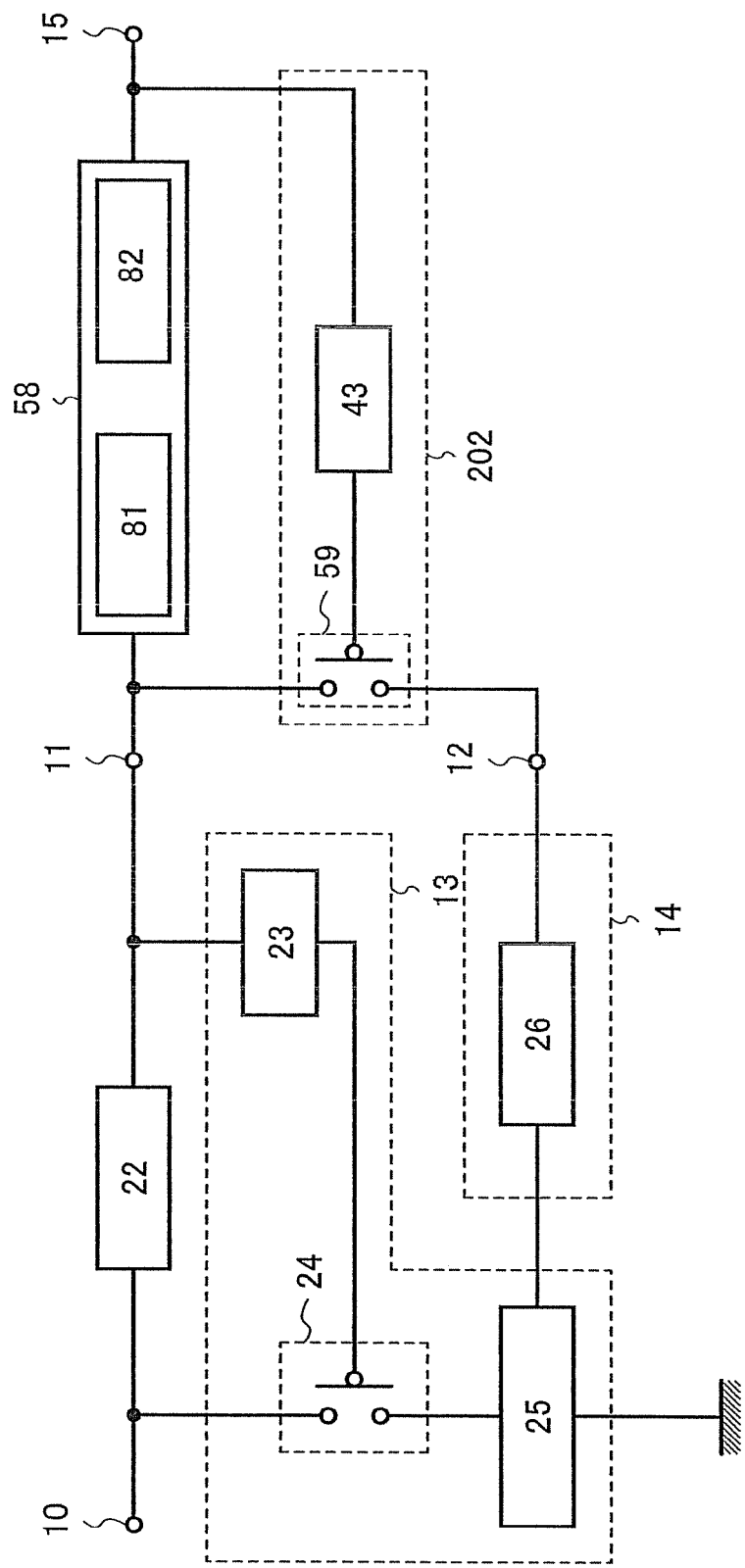
FIG. 7 is a diagram showing one example of the structure of a semiconductor device of the present invention.

A semiconductor device described in this embodiment mode includes the input portion 10; the first DC converter circuit 22; the limiter circuit 13; the charging circuit 14; a constant voltage circuit 58 which uses the first DC converter circuit 22 and the battery 26 as supply sources; and a second discharge controller circuit 202 (see FIG. 7). Note that the limiter circuit 13 includes the first detecting circuit 23, the switching element 24, and the second DC converter circuit 25, the charging circuit 14 includes the battery 26, and the second discharge controller circuit 202 includes the second detecting circuit 43 and a switching element 59.

Specifically, this structure is different from the structure described in Embodiment Mode 3 in the number of constant voltage circuits and the structure of the discharge controller circuit.

Operation of the semiconductor device described in this embodiment mode is described below.

First, an alternating-current voltage is input to the input portion 10 from outside, and the first DC converter circuit 22 converts the alternating-current voltage into a direct-current voltage and inputs to the first detecting circuit 23. In the case where the direct-current voltage input to the first detecting circuit 23 is less than a constant voltage value (Vx), the switching element 24 is maintained at the OFF state (the state in which the input portion 10 and the second DC converter circuit 25 are electrically isolated from each other) so that the direct-current voltage is not supplied to the second DC converter circuit 25. As a result, the alternating-current voltage input to the input portion 10 is supplied to the first output portion 11, that is, the constant voltage circuit 58 after being converted into the direct-current voltage by the first DC converter circuit 22. During the period in which the second detecting circuit 43 is not operated, the switching element 59 is turned off, whereby an output voltage of the first DC converter circuit 22 is applied to the constant voltage circuit 58, and a voltage generated in the constant voltage circuit 58 is applied to the third output portion 15.

On the other hand, in the case where the direct-current voltage input to the first detecting circuit 23 is greater than or equal to the constant voltage value (Vx), a voltage is applied to the switching element 24 to turn the switching element 24 on (the state in which the input portion 10 and the second DC converter circuit 25 are electrically connected to each other). As a result, the alternating-current voltage input to the input portion 10 is supplied to the constant voltage circuit 58 after being converted into the direct-current voltage by the first DC converter circuit 22, and supplied to the battery 26 provided in the charging circuit 14 after being converted into the direct-current voltage by the second DC converter circuit 25. During the period in which the second discharge controller circuit 202 is not operated, the switching element 59 is turned off, whereby the first DC converter circuit 22 supplies the direct-current voltage to the constant voltage circuit 58 and a charging voltage of the battery 26 is not supplied to the constant voltage circuit 58.

Further, in the state where the battery 26 has been charged, when an alternating-current voltage which is lower than the minimum operating voltage is supplied to the input portion 10, a direct-current voltage input to the first detecting circuit 23 is less than the constant voltage value (Vx), whereby a voltage is not applied to the switching element 24 to turn the switching element 24 off (the state in which the input portion 10 and the second DC converter circuit 25 are electrically isolated from each other). As a result, the alternating-current voltage input to the input portion 10 is supplied to the constant voltage circuit 58 after being converted into the direct-current voltage by the first DC converter circuit 22. Further, when the direct-current voltage input to the second detecting circuit 43 becomes to be less than the constant voltage value (Vy), a voltage is applied to the switching element 59 to turn the switching element 59 on (the state in which the input portion 10 and the second output portion 12 are electrically connected to each other), whereby the charging voltage of the battery 26 is applied to the constant voltage circuit 58. As a result, even if an alternating-current voltage which is lower than the minimum chip operating voltage is supplied to the input portion 10, a voltage which is greater than or equal to the saturation voltage (Vz) of the constant voltage circuit 58 can be generated by utilizing the charging voltage of the battery 26.

The first DC converter circuit 22 converts an alternating-current voltage input from the input portion 10 into a direct-current voltage and outputs to the constant voltage circuit 58 and the limiter circuit 13. The second DC converter circuit 25 converts the alternating-current voltage input from the input portion 10 into the direct-current voltage and outputs to the charging circuit 14 when the switching element 24 is turned on. Each of the first DC converter circuit 22 and the second DC converter circuit 25 can be fowled of a half-wave rectifier, a half-wave double-voltage rectifier, a full-wave rectifier, a Cockcroft circuit, or the like. Note that the first DC converter circuit 22 and the second DC converter circuit 25 can employ either the same structure or different structures.

Note that, by provision of the first detecting circuit 23 after the first DC converter circuit 22, the limiter circuit 13 can be operated by an output voltage which is less than the maximum rating of the first DC converter circuit 22 in FIG. 7; however, the first detecting circuit 23 may also be provided at another position.

Although the second DC converter circuit 25 is provided in the limiter circuit 13 in FIG. 7, the second DC converter circuit 25 may be provided in the charging circuit 14, as well.

There is a correlation between alternating-current voltage input to the input portion 10 and direct-current voltage output from the first DC converter circuit 22; as the alternating-current voltage input to the input portion 10 increases, the output voltage of the first DC converter circuit 22 increases. Since a voltage output from the first DC converter circuit 22 which is higher than a certain value may destroy circuits including the first DC converter circuit 22 connected to the first output portion 11, the limiter circuit 13 is provided such that when a high alternating-current voltage is supplied to the input portion 10, the high alternating-current voltage is also supplied to the charging circuit 14 in addition to the third output portion 15. That is, by provision of an additional load in parallel, a burden on the first DC converter circuit 22 can be decreased.

When the alternating-current voltage input to the input portion 10 is decreased, and an output voltage of the constant voltage circuit 58 is detected by the second detecting circuit 43 and upon reaching a voltage (less than or equal to Vy) at which the second discharge controller circuit 202 is operated, the switching element 59 is turned on; therefore, the output voltage of the first DC converter circuit 22 and the charging voltage of the charging circuit 14 are supplied to the constant voltage circuit 58, and the output voltage of the constant voltage circuit 58 is applied to the third output portion 15. As for the above-described second discharge controller circuit 202, if the charging voltage of the charging circuit 14 is applied to the constant voltage circuit 58 in the state where the first DC converter circuit 22 applies the input voltage maximum rating of the constant voltage circuit 58 to the constant voltage circuit 58, the constant voltage circuit 58 may be destroyed; therefore, it is necessary to consider the discharge condition of the charging circuit 14 as usage. Note that, if the operating voltage of the second detecting circuit 43 is set to the minimum chip operating voltage, a chip may stop operating after the battery is discharged; therefore, the operating voltage of the second detecting circuit 43 is set to be slightly higher than the minimum chip operating voltage.

Note that the position of the second detecting circuit 43 is not limited to the output of the constant voltage circuit 58 described in this embodiment mode. For example, the second detecting circuit 43 may also be provided at an output of the first DC converter circuit 22.

The constant voltage circuit 58 can include the reference circuit 81 which generates a reference voltage for voltage comparison by the differential amplifier circuit 82 and the differential amplifier circuit 82 which compares the output voltage of the constant voltage circuit 58 to the voltage generated by the reference circuit 81 (see FIGS. 13A and 13B).

Further, at the time of charging, by controlling an impedance Z1 where the first DC converter circuit 22 and the circuit connected to the first output portion 11 are connected in series and an impedance Z2 where the second DC converter circuit 25 and the battery 26 are connected in series, the ratio of supply electric power between the circuit connected to the first output portion 11 and the battery 26 can be adjusted. Controlling of the impedance Z1 and the impedance Z2 depends on the size of the first DC converter circuit 22 and the second DC converter circuit 25; therefore, the values of the impedance Z1 and the impedance Z2 can be controlled as appropriate by the size of the first DC converter circuit 22 and the second DC converter circuit 25 being set as selected.

Further, the charge controller circuit 27 may be provided in the charging circuit 14 so that charging of the battery 26 is controlled.

This embodiment mode can be implemented in combination with the structure of any semiconductor device described in any other embodiment mode in this specification.

(Embodiment Mode 5)

Figure 8:
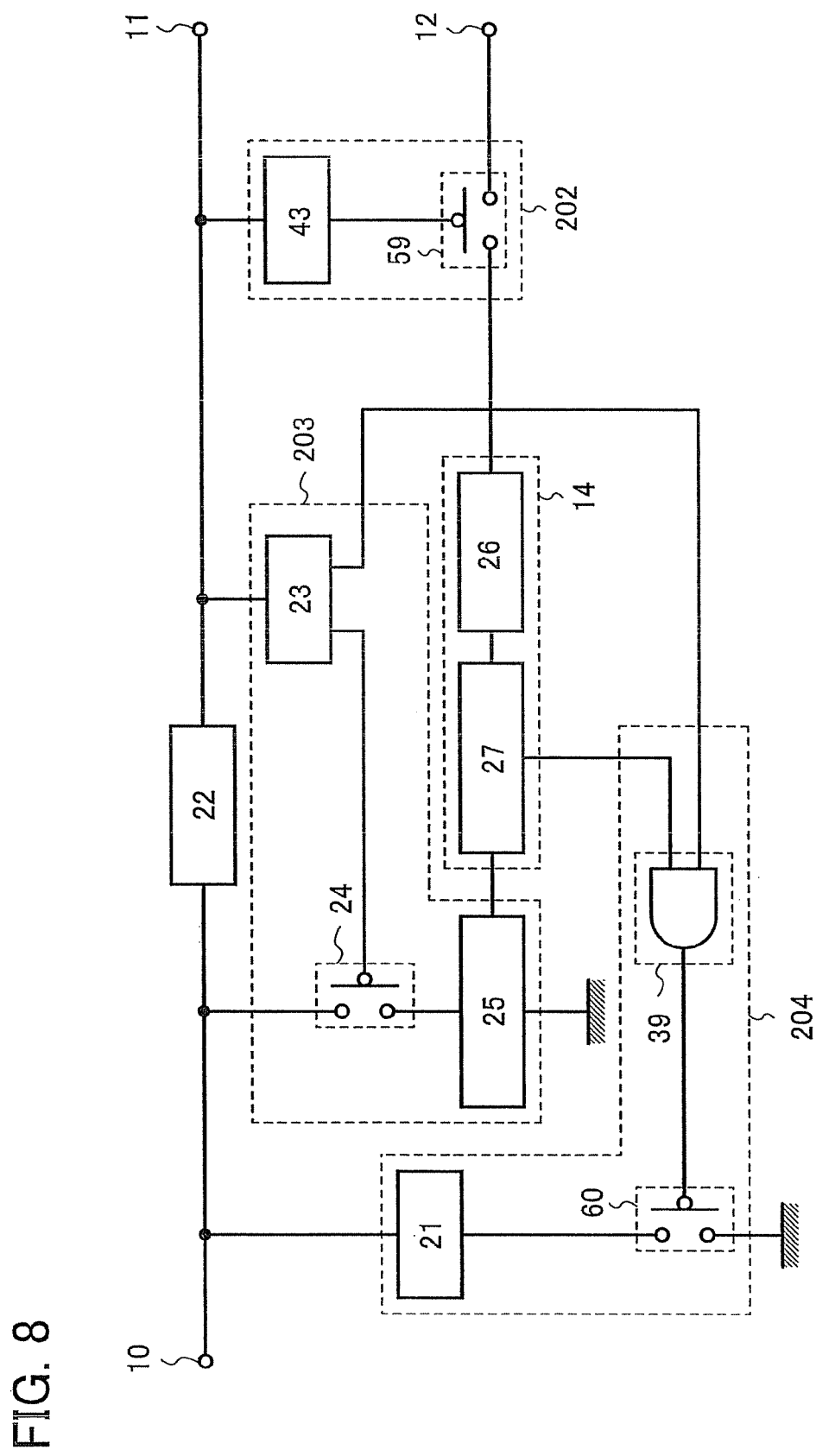
FIG. 8 is a diagram showing one example of the structure of a semiconductor device of the present invention.

A semiconductor device described in this embodiment mode includes the input portion 10; a first limiter circuit 203; the charging circuit 14; the second discharge controller circuit 202; a second limiter circuit 204; and the first DC converter circuit 22 (see FIG. 8). Note that the first limiter circuit 203 includes the first detecting circuit 23, the switching element 24, and the second DC converter circuit 25, the charging circuit 14 includes the battery 26 and the charge controller circuit 27, the second discharge controller circuit 202 includes the second detecting circuit 43 and the switching element 59, and the second limiter circuit 204 includes an AND circuit 39, an electrical element 21, and a switching element 60.

Operation of the semiconductor device described in this embodiment mode is described below.

First, an alternating-current voltage is input to the input portion 10 from outside, and the first DC converter circuit 22 converts the alternating-current voltage into a direct-current voltage and inputs to the first detecting circuit 23. In the case where the direct-current voltage input to the first detecting circuit 23 is less than a constant voltage value (Vx), the switching element 24 is maintained at the OFF state (the state in which the input portion 10 and the second DC converter circuit 25 are electrically isolated from each other) so that the direct-current voltage is not supplied to the second DC converter circuit 25. As a result, the alternating-current voltage input to the input portion 10 is applied to the first output portion 11 after being converted into the direct-current voltage by the first DC converter circuit 22.

On the other hand, in the case where the direct-current voltage input to the first detecting circuit 23 is greater than or equal to the constant voltage value (Vx), a voltage is applied to the switching element 24 to turn the switching element 24 on (the state in which the input portion 10 and the second DC converter circuit 25 are electrically connected to each other). As a result, the alternating-current voltage input to the input portion 10 is applied to the first output portion 11 after being converted into the direct-current voltage by the first DC converter circuit 22. Further, the alternating-current voltage input to the input portion 10 is supplied to the battery 26 provided in the charging circuit 14 after being converted into the direct-current voltage by the second DC converter circuit 25 through the switching element 24. During the period in which the second discharge controller circuit 202 is not operated, the switching element 59 is turned off, whereby the first DC converter circuit 22 applies the direct-current voltage to the first output portion 11 and a charging voltage of the charging circuit 14 is not applied to the second output portion 12.

When the alternating-current voltage input to the input portion 10 is decreased, and an output voltage of the first DC converter circuit 22 is detected by the second detecting circuit 43 and upon reaching a voltage (less than or equal to Vy) at which the second discharge controller circuit 202 is operated, the switching element 59 is turned on; therefore, the output voltage of the first DC converter circuit 22 is applied to the first output portion 11 and the charging voltage of the charging circuit 14 is applied to the second output portion 12. As for the above-described second discharge controller circuit 202, it is necessary to determine the discharge condition of the charging circuit 14 as usage. By setting the operating voltage of the second discharge controller circuit 202 to be equal to the minimum operating voltage of the semiconductor device plus a, the semiconductor device being used as a wireless tag is prevented from being in a non-operating state, and communication distance characteristics on the long-distance side thereof can be improved.

The first DC converter circuit 22 converts an alternating-current voltage input from the input portion 10 into a direct-current voltage and outputs the direct-current voltage. The second DC converter circuit 25 converts the alternating-current voltage input from the input portion 10 into the direct-current voltage and outputs to the charging circuit 14 when the switching element 24 is turned on. Each of the first DC converter circuit 22 and the second DC converter circuit 25 can be fowled of a half-wave rectifier, a half-wave double-voltage rectifier, a full-wave rectifier, a Cockcroft circuit, or the like. Note that the first DC converter circuit 22 and the second DC converter circuit 25 can employ either the same structure or different structures.

Although the second DC converter circuit 25 is provided in the first limiter circuit 203 in FIG. 8, the second DC converter circuit 25 may be provided in the charging circuit 14, as well.

In the case where the battery 26 in the charging circuit 14 has been fully charged and a voltage by which the first detecting circuit 23 is operated is generated by the first DC converter circuit 22, the second DC converter circuit 25 and the battery 26 are shut down by the charge controller circuit 27 in the charging circuit 14 in order to prevent overcharging of the battery 26. Therefore, no countermeasures against deterioration of the first DC converter circuit 22 are taken. In order to prevent this, the second limiter circuit 204 is provided at the input portion 10 in this embodiment mode. The second limiter circuit 204 operates when the first detecting circuit 23 operates, depending on the charging state of the battery 26 (e.g., in the state where the battery has been fully charged) as described above. Further, by setting the size of the electrical element 21 to be as small as possible in the case of a resistor and as large as possible in the case of a capacitor, the amount of current which flows through the electrical element 21 can be increased and the impedance can be charged greatly. It is necessary to determine the size of the electrical element 21 in view of this.

Note that the position of the second detecting circuit 43 is not limited to the output of the first DC converter circuit 22 described in this embodiment mode. For example, a constant voltage circuit, an integrated circuit, or the like may be connected to the first output portion 11 and the second output portion 12 as described above, and the second detecting circuit 43 may be provided at an input or an output thereof.

Further, at the time of charging, by controlling an impedance Z1 where the first DC converter circuit 22 and the circuit connected to the first output portion 11 are connected in series and an impedance Z2 where the second DC converter circuit 25 and the charging circuit 14 are connected in series, the ratio of supply electric power between the circuit connected to the first output portion 11 and the battery 26 can be adjusted. Controlling of the impedance Z1 and the impedance Z2 depends on the size of the first DC converter circuit 22 and the second DC converter circuit 25; therefore, the values of the impedance Z1 and the impedance Z2 can be controlled as appropriate by the size of the first DC converter circuit 22 and the second DC converter circuit 25 being set as selected.

As described above, by connecting the electrical element 21, the switching element 60, the AND circuit 39, and the charge controller circuit 27 to the semiconductor device of Embodiment Mode 2 as shown in FIG. 8, countermeasures against deterioration for both the first DC converter circuit 22 and the battery 26 in the state where the battery 26 has been fully charged can be taken in this embodiment mode.

This embodiment mode can be implemented in combination with the structure of any semiconductor device described in any other embodiment mode in this specification.

(Embodiment Mode 6)

Figure 9:
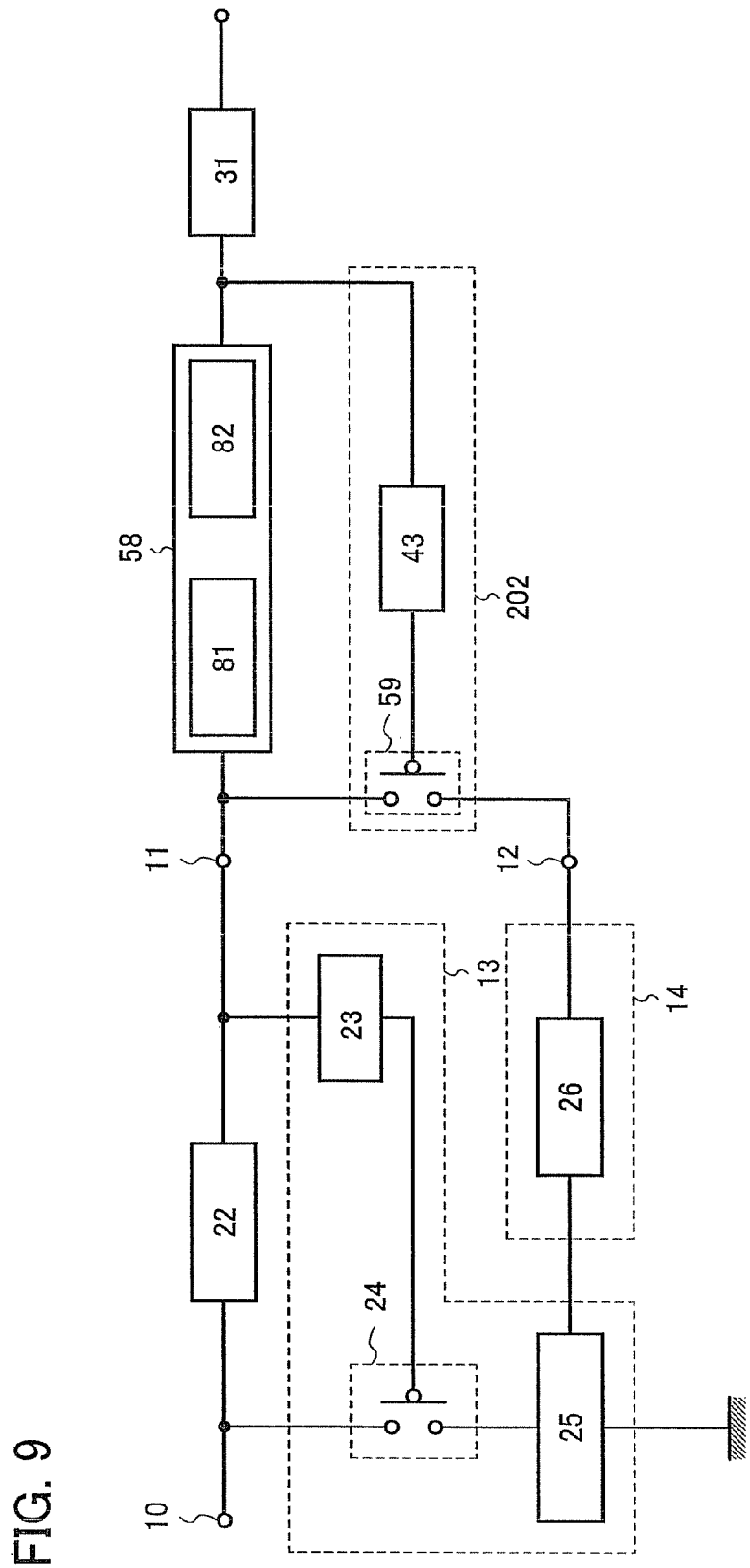
FIG. 9 is a diagram showing one example of the structure of a semiconductor device of the present invention.

A semiconductor device described in this embodiment mode includes the input portion 10; the first DC converter circuit 22; the limiter circuit 13; the charging circuit 14; the constant voltage circuit 58 which uses the first DC converter circuit 22 and the battery 26 as supply sources; the second discharge controller circuit 202; and the clock generating circuit 31 (see FIG. 9). Note that the limiter circuit 13 includes the first detecting circuit 23, the switching element 24, and the second DC converter circuit 25, the charging circuit 14 includes the battery 26, and the second discharge controller circuit 202 includes the second detecting circuit 43, which detects an output voltage of the constant voltage circuit 58, and the switching element 59.

It is an object of this embodiment mode to suppress fluctuations in oscillation frequency of the clock generating circuit 31 caused by a drop in output voltage of the first DC converter circuit 22 at the time of modulation. In order to suppress the fluctuations in oscillation frequency of the clock generating circuit 31, it is necessary to stabilize the output voltage of the constant voltage circuit 58. The supply source of the constant voltage circuit 58 is the first DC converter circuit 22, and the oscillation frequency of the clock generating circuit 31 fluctuates when the output voltage of the first DC converter circuit 22 is less than the saturation output voltage of the constant voltage circuit 58. That is, as for a countermeasure against the fluctuations in oscillation frequency of the clock generating circuit 31, the fluctuations in oscillation frequency of the clock generating circuit 31 can be suppressed if a voltage supplied to the constant voltage circuit 58 is always greater than or equal to the saturation output voltage of the constant voltage circuit 58. Therefore, it is an object of this embodiment mode to solve the above-described problem by supplying a charging voltage of the charging circuit 14 to the constant voltage circuit 58 such that the voltage supplied to the constant voltage circuit 58 is always greater than or equal to the saturation voltage of the constant voltage circuit 58.

Operation of the semiconductor device described in this embodiment mode is described below.

First, an alternating-current voltage is input to the input portion 10 from outside, and the first DC converter circuit 22 converts the alternating-current voltage into a direct-current voltage and inputs to the first detecting circuit 23. In the case where the direct-current voltage input to the first detecting circuit 23 is less than a constant voltage value (Vx), the switching element 24 is maintained at the OFF state (the state in which the input portion 10 and the second DC converter circuit 25 are electrically isolated from each other) so that the direct-current voltage is not supplied to the second DC converter circuit 25. As a result, the alternating-current voltage input to the input portion 10 is applied to the constant voltage circuit 58 after being converted into the direct-current voltage by the first DC converter circuit 22. Then, the constant voltage circuit 58 applies a constant voltage to the clock generating circuit 31, and the clock generating circuit 31 generates a clock. Here, if the voltage output from the first DC converter circuit 22 drops to be less than the saturation voltage of the constant voltage circuit 58, the output voltage of the constant voltage circuit 58 also drops, whereby the oscillation frequency of the clock generating circuit 31 becomes unstable.

On the other hand, in the case where the direct-current voltage input to the first detecting circuit 23 is greater than or equal to the constant voltage value (Vx), a voltage is applied to the switching element 24 to turn the switching element 24 on (the state in which the input portion 10 and the second DC converter circuit 25 are electrically connected to each other). As a result, the alternating-current voltage input to the input portion 10 is applied to the first output portion 11 after being converted into the direct-current voltage by the first DC converter circuit 22. Further, the alternating-current voltage input to the input portion 10 is applied to the battery 26 provided in the charging circuit 14 after being converted into the direct-current voltage by the second DC converter circuit 25 through the switching element 24. During the period in which the second discharge controller circuit 202 is not operated, the switching element 59 is turned off, whereby the first DC converter circuit 22 applies the direct-current voltage to the constant voltage circuit 58 and a charging voltage of the battery 26 is not applied to the constant voltage circuit 58. An output voltage of the constant voltage circuit 58 is applied to the clock generating circuit 31, and the clock generating circuit 31 generates a clock and outputs it.

When the alternating-current voltage input to the input portion 10 is decreased, and an output voltage of the first DC converter circuit 22 is detected by the second detecting circuit 43 and upon reaching a voltage (less than or equal to fly) at which the second discharge controller circuit 202 is operated, the switching element 59 is turned on; therefore, the output voltage of the first DC converter circuit 22 and the charging voltage of the charging circuit 14 are applied to the constant voltage circuit 58. As for the above-described second discharge controller circuit 202, it is necessary to determine the discharge condition of the charging circuit 14 as usage.

The first DC converter circuit 22 converts an alternating-current voltage that is input from the input portion 10 into a direct-current voltage to be output to the constant voltage circuit 58 and the limiter circuit 13. The second DC converter circuit 25 converts an alternating-current voltage that is input from the input portion 10 into a direct-current voltage to be output to the charging circuit 14 when the switching element 24 is turned on. Each of the first DC converter circuit 22 and the second DC converter circuit 25 can be formed of a half-wave rectifier; a half-wave double-voltage rectifier, a full-wave rectifier, a Cockcroft circuit, or the like. Note that the first DC converter circuit 22 and the second DC converter circuit 25 can employ either the same structure or different structures.

Note that, by provision of the detecting circuit 23 after the first DC converter circuit 22, the limiter circuit 13 can be operated by an output voltage which is less than the maximum rating of the first DC converter circuit 22 in FIG. 9; however, the detecting circuit 23 may also be provided at another position.

Although the second DC converter circuit 25 is provided in the limiter circuit 13 in FIG. 9, the second DC converter circuit 25 may be provided in the charging circuit 14, as well.

The position of the second detecting circuit 43 is not limited to the position at an output of the constant voltage circuit 58, described in this embodiment mode. For example, the second detecting circuit 43 may also be provided at an output of the first DC converter circuit 22.

Further, at the time of charging, by controlling an impedance Z1 where the first DC converter circuit 22 and the circuit connected to the first output portion 11 are connected in series and an impedance Z2 where the second DC converter circuit 25 and the charging circuit 14 are connected in series, the ratio of supply electric power between the circuit connected to the first output portion 11 and the battery 26 can be adjusted. Controlling of the impedance Z1 and the impedance Z2 depends on the size of the first DC converter circuit 22 and the second DC converter circuit 25; therefore, the values of the impedance Z1 and the impedance Z2 can be controlled as appropriate by the size of the first DC converter circuit 22 and the second DC converter circuit 25 being set as selected.

As described above, in this embodiment mode, countermeasures can be taken against deterioration of the first DC converter circuit 22 at the time of short-distance communication and fluctuations in oscillation frequency of the clock generating circuit can be suppressed by connecting the clock generating circuit 31 to the third output portion 15 of Embodiment Mode 4 such that the second discharge controller circuit is operated by a voltage which is less than the saturation voltage value of the constant voltage circuit 58.

This embodiment mode can be implemented in combination with the structure of any semiconductor device described in any other embodiment mode in this specification.

(Embodiment Mode 7)

In this embodiment mode, a semiconductor device which is different from those of the above-described embodiment modes is described using a drawing.

Figure 10:
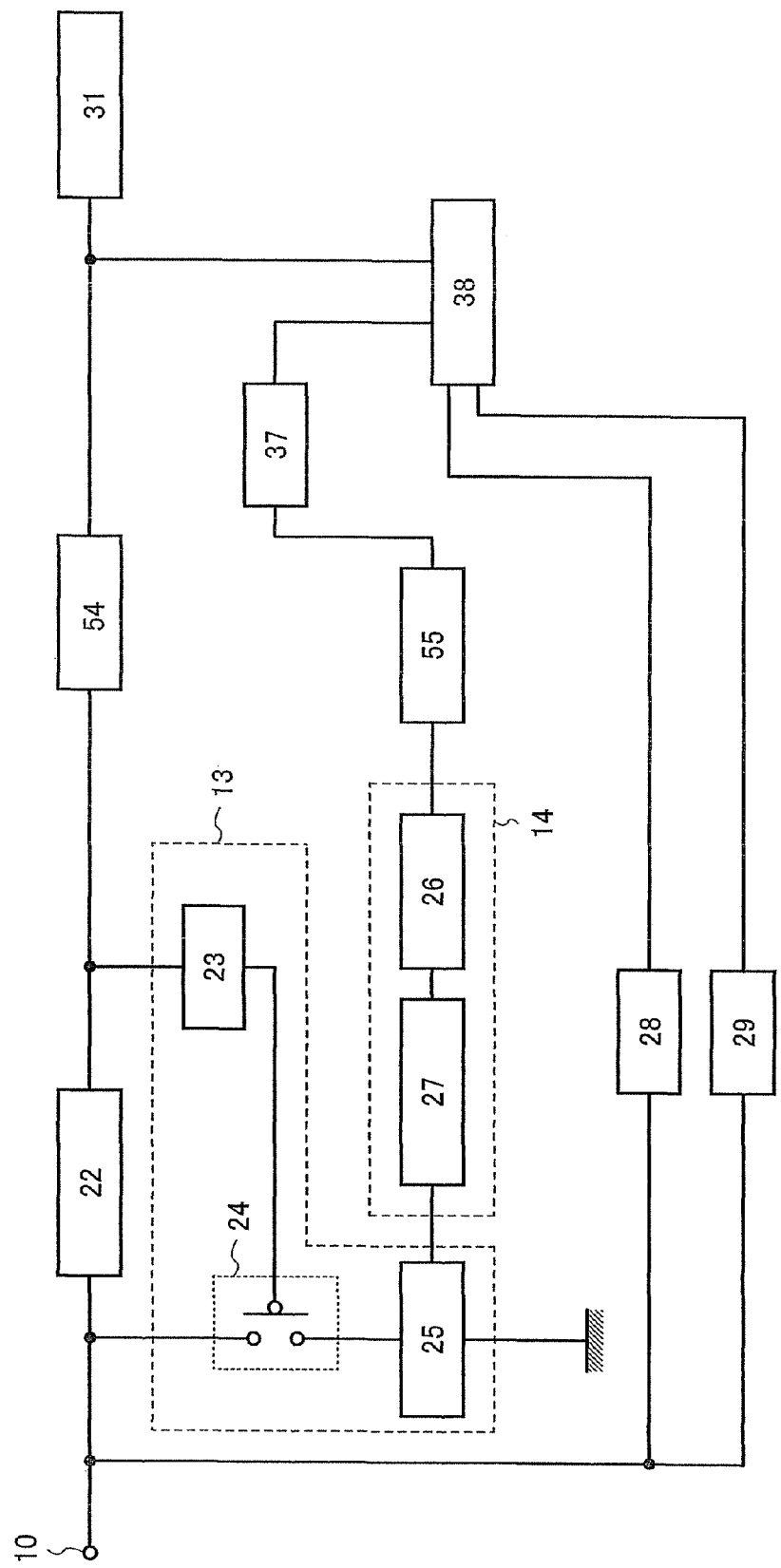
FIG. 10 is a diagram showing one example of the structure of a semiconductor device of the present invention.

A semiconductor device described in this embodiment mode includes the first DC converter circuit 22; the limiter circuit 13; the charging circuit 14; the modulating circuit 28 which modulates encoded data; the demodulating circuit 29 which digitalizes a received signal; the first constant voltage circuit 54 which makes an output voltage of the first DC converter circuit 22 a constant voltage; the second constant voltage circuit 55 which makes an output voltage of the charging circuit 14 a constant voltage; the clock generating circuit 31; a memory 37; and the logic circuit 38 (see FIG. 10). Note that the limiter circuit 13 includes the first detecting circuit 23, the switching element 24, and the second DC converter circuit 25, and the charging circuit 14 includes the battery 26 and the charge controller circuit 27. The constant voltage output from the first constant voltage circuit 54 is supplied to the logic circuit 38, and the constant voltage output from the second constant voltage circuit 55 is supplied to the memory 37.

As described above, by supplying electric power from the battery 26 to the memory 37, the memory 37, which may be an SRAM or a DRAM, can hold data even if electric power is not supplied from outside. For example, when an SRAM is used as the memory 37, data can be written into the memory 37 when electric power is supplied from outside via an antenna connected to the input portion 10, and data of the memory 37 can be held due to application of electric power supplied from the battery 26 when electric power is not supplied from outside.

This embodiment mode can be implemented in combination with the structure of any semiconductor device described in any other embodiment mode in this specification.

(Embodiment Mode 8)

In this embodiment mode, one example of a manufacturing method of a semiconductor device described in the above embodiment mode is described using drawings. In this embodiment mode, the case where elements included in circuits such as a limiter circuit, a logic circuit, a charging circuit, or the like are provided over the same substrate, using thin film transistors is described. Further, an example in which a thin-film secondary battery is used as a battery provided in the charging circuit is described. It is needless to say that an electric double layer capacitor or the like may also be provided instead of the secondary battery. Note that, in this embodiment mode, the case where the elements such as the thin film transistors are provided over a support substrate once, and then transposed to a flexible substrate is described.

A separation layer 1303 is formed over one surface of a substrate 1301 with an insulating film 1302 interposed therebetween, and subsequently an insulating film 1304 which functions as a base film and a semiconductor film 1305 (e.g., a film containing amorphous silicon) are stacked (FIG. 14A). The insulating film 1302, the separation layer 1303, the insulating film 1304, and the semiconductor film 1305 can be foamed consecutively.

As the substrate 1301, a glass substrate, a quartz substrate, a metal substrate such as a stainless steel substrate, a ceramic substrate, a semiconductor substrate such as a Si substrate, an SOI (Silicon On Insulator) substrate, or the like can be used. As the plastic substrate, a substrate made of PET (polyethylene terephthalate), PEN (polyethylenenaphthalate), PES (polyethersulfone), or the like can be used. Note that, in this process, the separation layer 1303 is provided over an entire surface of the substrate 1301 with the insulating film 1302 interposed therebetween; however, after providing the separation layer over the entire surface of the substrate 1301, the separation layer may be selectively etched by photolithography, as needed.

Further, each of the insulating films 1302 and 1304 is formed of an insulating material such as silicon oxide ($SiO_x$), silicon nitride ($SiN_x$), silicon oxynitride ($SiO_xN_y$, x>y), or silicon nitride oxide ($SiN_xO_y$, x>y) by a CVD method, a sputtering method, or the like. For example, when each of the insulating films 1302 and 1304 is formed to have a two-layer structure, a silicon nitride oxide film may be formed as a first-layer insulating film and a silicon oxynitride film may be formed as a second-layer insulating film. Alternatively, a silicon nitride film may be formed as the first-layer insulating film and a silicon oxide film may be formed as the second-layer insulating film. The insulating film 1302 functions as a blocking layer which prevents an impurity element from getting mixed into the peeling layer 1303 or elements formed thereover, from the substrate 1301. The insulating film 1304 functions as a blocking layer which prevents an impurity element from getting mixed into elements formed over the substrate 1301 and the peeling layer 1303, from the substrate 1301 or the peeling layer 1303. In this manner, provision of the insulating films 1302 and 1304 which function as the blocking layers can prevent adverse effects on the elements formed over the peeling layer 1303, which would otherwise be caused by an alkali metal such as Na or an alkaline earth metal contained in the substrate 1301. Note that, when quartz is used for the substrate 1301, the insulating films 1302 and 1304 may be omitted.

The peeling layer 1303 may be formed of a metal film, a stacked-layer structure of a metal film and a metal oxide film, or the like. As the metal film, either a single layer or a stacked layer is formed using a film of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or an alloy material or a compound material containing such an element as its main component. In addition, such a material can be fanned by a sputtering method, various CVD methods such as a plasma CVD method, or the like. The stacked-layer structure of a metal film and a metal oxide film can be obtained by the following: the above-described metal film is formed, and then plasma treatment in an oxygen atmosphere or an N₂O atmosphere or heat treatment in an oxygen atmosphere or an N₂O atmosphere is performed thereto, so that oxide or oxynitride of the metal film can be provided on the surface of the metal film. For example, when a tungsten film is provided as the metal film by a sputtering method, a CVD method, or the like, a metal oxide film of tungsten oxide can be formed on the surface of the tungsten film by performing plasma treatment to the tungsten film. Further alternatively, a metal film (e.g., tungsten) may be formed, and then, as well as an insulating film formed of silicon oxide or the like may be formed over the metal film by a sputtering method, metal oxide (e.g., tungsten oxide on tungsten) may be formed on the metal film.

The amorphous semiconductor film 1305 is formed with a thickness of 25 to 200 nm (preferably, 30 to 150 nm) by a sputtering method, an LPCVD method, a plasma CVD method, or the like.

Next, the amorphous semiconductor film 1305 is crystallized by laser irradiation. Note that, crystallization of the amorphous semiconductor film 1305 may be performed by a method combining the laser crystallization with a thermal crystallization method using RTA or an annealing furnace or with a thermal crystallization method using a metal element that promotes the crystallization, as well. After that, the crystallized semiconductor film is etched into a desired shape, whereby crystalline semiconductor films 1305a to 1305f are formed. Then, a gate insulating film 1306 is formed so as to cover the crystalline semiconductor films 1305a to 1305f (see FIG. 14B).

The gate insulating film 1306 is formed of an insulating material such as silicon oxide, silicon nitride, silicon oxynitride, or silicon nitride oxide by a CVD method, a sputtering method, or the like. For example, when the gate insulating film 1306 is formed to have a two-layer structure, a silicon oxynitride film may be formed as a first-layer insulating film and a silicon nitride oxide film may be formed as a second-layer insulating film. Alternatively, a silicon oxide film may be fanned as the first-layer insulating film and a silicon nitride film may be formed as the second-layer insulating film.

An example of a manufacturing process of the crystalline semiconductor films 1305a to 1305f is briefly described below. First, an amorphous semiconductor film with a thickness of 50 to 60 nm is formed by a plasma CVD method. Then, after a solution containing nickel which is a metal element for promoting crystallization is retained on the amorphous semiconductor film, dehydrogenation treatment (at 500° C. for 1 hour) and thermal crystallization treatment (at 550° C. for 4 hours) are performed to the amorphous semiconductor film, whereby a crystalline semiconductor film is formed. Then, the crystalline semiconductor film is irradiated with laser light and a photolithography method is applied, whereby the crystalline semiconductor films 1305a to 1305f are formed. Note that crystallization of the amorphous semiconductor film may be conducted only by laser light irradiation without performing thermal crystallization using a metal element for promoting crystallization, as well.

As a laser oscillator used for the crystallization, either a continuous wave laser (a CW laser) or a pulsed laser can be used. As a laser that can be used here, there are gas lasers such as an Ar laser, a Kr laser, and an excimer laser; a laser in which single-crystalline YAG, YVO₄, forsterite (Mg₂SiO₄), YAlO₃, or GdVO₄ or polycrystalline (ceramic) YAG, Y₂O₃, YVO₄, YAlO₃, or GdVO₄ is doped with one or more laser media selected from among Nd, Yb, Cr, Ti, Ho, Er, Tm, and Ta as dopant; a glass laser; a ruby laser; an alexandrite laser; a Ti:sapphire laser; a copper vapor laser; and a metal vapor laser. When irradiation is conducted with the fundamental wave of such a laser or any of the second to fourth harmonics thereof, crystals with a large grain size can be obtained. For example, the second harmonic (532 nm) or the third harmonic (355 nm) of an Nd:YVO₄ laser (the fundamental wave: 1064 nm) can be used. At this time, a laser power density of about 0.01 to 100 MW/cm² (preferably, 0.1 to 10 MW/cm²) is required, and irradiation is conducted with a scanning rate of about 10 to 2000 cm/sec. Note that the laser in which single-crystalline YAC YVO₄, forsterite (Mg₂SiO₄), YAlO₃, or GdVO₄ or polycrystalline (ceramic) YAG; Y₂O₃, YVO₄, YAlO₃, or GdVO₄ is doped with one or more laser media selected from among Nd, Yb, Cr, Ti, Ho, Er, Tm, and Ta as dopant; an Ar-ion laser, or a Ti:sapphire laser can be used as a CW laser, and they can also be used as pulsed laser with a repetition rate of 10 MHz or more by being combined with a Q-switch operation, mode locking, or the like. When a laser beam with a repetition rate of 10 MHz or more is used, it is possible for a semiconductor film to be irradiated with the next pulse until it becomes solidified after it is melted by laser. Therefore, unlike the case of using a pulsed laser with a low repetition rate, a solid-liquid interface in the semiconductor film can be continuously moved. Thus, crystal grains which have grown continuously in the scanning direction can be obtained.

The gate insulating film 1306 may be formed by oxidization or nitridation of the surfaces of the semiconductor films 1305a to 1305f with the above-described high-density plasma treatment. For example, plasma treatment with a mixed gas of a rare gas such as He, Ar, Kr, or Xe, and oxygen, nitrogen oxide (NO₂), ammonia, nitrogen, hydrogen, or the like is performed. When plasma is excited by the introduction of microwaves, plasma with a low electron temperature and high density can be generated. With oxygen radicals (which may include OH radicals) or nitrogen radicals (which may include NH radicals) generated by the high-density plasma, each surface of the semiconductor films can be oxidized or nitrided.

By such high-density plasma treatment, an insulating film with a thickness of 1 to 20 nm, typically 5 to 10 nm, is formed on the semiconductor films. Since this reaction is a solid-phase reaction, the interface state density between the insulating film and the semiconductor films can be quite low. Since such high-density plasma treatment directly oxidizes (or nitrides) the semiconductor films (crystalline silicon or polycrystalline silicon), an insulating film can be formed ideally with extremely little unevenness in thickness. In addition, since crystal grain boundaries of crystalline silicon are not strongly oxidized, an excellent state is obtained. That is, by the solid-phase oxidation of the surfaces of the semiconductor films by the high-density plasma treatment described in this embodiment mode, an insulating film with a uniform thickness and low interface state density can be formed without excessive oxidation reaction at the crystal grain boundaries.

As the gate insulating film, only an insulating film formed by high-density plasma treatment may be used, or a stacked layer obtained by deposition of an insulating film such as silicon oxide, silicon oxynitride, or silicon nitride on the insulating film with a CVD method using plasma or thermal reaction may be employed. In either case, a transistor which includes such an insulating film formed by high-density plasma treatment in a part or the whole of its gate insulating film can have less variation in characteristics.

Further, the semiconductor films 1305a to 1305f, which are obtained by irradiation of a semiconductor film with a continuous wave laser beam or a laser beam oscillated with a repetition rate of 10 MHz or more and scanning the semiconductor film with the laser beam in one direction to crystallize the semiconductor film, have a characteristic of crystal growth in the beam scanning direction. Transistors are arranged so that their channel length directions (the directions in which carriers move when a channel is formed) are aligned with the scanning direction, and the above-described gate insulating film is combined, whereby thin film transistors (TFTs) with high electron field effect mobility and less variation in characteristics can be obtained.

Next, a first conductive film and a second conductive film are stacked over, the gate insulating film 1306. Here, the first conductive film is formed to a thickness of 20 to 100 nm by a CVD method, a sputtering method, or the like. The second conductive film is formed to a thickness of 100 to 400 nm. Each of the first conductive film and the second conductive film is formed of an element selected from tantalum (Ta), tungsten (W), titanium (Ti), molybdenum (Mo), aluminum (Al), copper (Cu), chromium (Cr), niobium (Nb), or the like, or an alloy material or a compound material containing such an element as its main component. Further, a semiconductor material typified by polycrystalline silicon doped with an impurity element such as phosphorus can be used, as well. As combination examples of the first conductive film and the second conductive film, a tantalum nitride film and a tungsten film; a tungsten nitride film and a tungsten film; a molybdenum nitride film and a molybdenum film; and the like can be given. Tungsten and tantalum nitride have high heat resistance. Therefore, after forming the first conductive film and the second conductive film, heat treatment for the purpose of thermal activation can be applied thereto. In the case where a two-layer structure is not employed, but a three-layer structure is employed, it is preferable to use a stacked-layer structure of a molybdenum film, an aluminum film, and a molybdenum film.

Next, a resist mask is formed by photolithography, and etching treatment is performed to form gate electrodes and gate lines, whereby gate electrodes 1307 are formed above the semiconductor films 1305a to 1305f. Here, a stacked-layer structure of a first conductive film 1307a and a second conductive film 1307b is shown as an example of each gate electrode 1307.

Next, the semiconductor films 1305a to 1305f are doped with an n-type impurity element at low concentration, using the gate electrodes 1307 as masks by an ion doping method or an ion implantation method. Then, a resist mask is selectively formed by photolithography, and doping with a p-type impurity element at high concentration is performed. As the n-type impurity element, phosphorus (P), arsenic (As), or the like can be used. As the p-type impurity element, boron (B), aluminum (Al), gallium (Ga), or the like can be used. Here, phosphorus (P) is used as the n-type impurity element and is selectively introduced into the semiconductor films 1305a to 1305f so as to be contained at concentrations of $1\times10^{15}$ to $1\times10^{19}$/cm$^3$, whereby n-type impurity regions 1308 are formed. In addition, boron (B) is used as the p-type impurity element and is selectively introduced into the semiconductor films 1305c and 1305e so as to be contained at concentrations of $1\times10^{19}$ to $1\times10^{20}$/cm$^3$, whereby p-type impurity regions 1309 are formed (see FIG. 14C).

Subsequently, an insulating film is formed so as to cover the gate insulating film 1306 and the gate electrodes 1307. The insulating film is formed of either a single layer or a stacked layer of a film containing an inorganic material such as silicon, silicon oxide, or silicon nitride, or a film containing an organic material such as an organic resin by a plasma CVD method, a sputtering method, or the like. Next, the insulating film is selectively etched by anisotropic etching mainly in the perpendicular direction, so that insulating films 1310 (also called sidewalls) which are in contact with side surfaces of the gate electrodes 1307 are formed. The insulating films 1310 are used as masks in doping for forming LDD (Lightly Doped Drain) regions.

Next, the semiconductor films 1305a, 1305b, 1305d, and 1305f are doped with an n-type impurity element at high concentration, using a resist mask formed by photolithography, the gate electrodes 1307, and the insulating films 1310 as masks. Thus, n-type impurity regions 1311 are formed. Here, phosphorus (P) is used as the n-type impurity element, and is selectively introduced into the semiconductor films 1305a, 1305b, 1305d, and 1305f so as to be contained at concentrations of $1\times10^{19}$ to $1\times10^{20}$/cm$^3$, whereby the n-type impurity regions 1311 with higher concentration of impurity than that of the impurity regions 1308 are formed.

Through the above steps, n-channel thin film transistors 1300a, 1300b, 1300d, and 1300f, and p-channel thin film transistors 1300c and 1300e are formed (see FIG. 14D).

In the n-channel thin film transistor 1300a, a channel formation region is formed in a region of the semiconductor film 1305a which overlaps with the gate electrode 1307; the impurity regions 1311 forming source and drain regions are formed in regions of the semiconductor film 1305a which do not overlap with the gate electrode 1307 and the insulating film 1310; and low-concentration impurity regions (LDD regions) are formed in regions of the semiconductor film 1305a which overlap with the insulating film 1310, between the channel formation region and the impurity regions 1311. Similarly, channel formation regions, low-concentration impurity regions, and the impurity regions 1311 are formed in the n-channel thin film transistors 1300b, 1300d, and 1300f.

In the p-channel thin film transistor 1300c, a channel formation region is formed in a region of the semiconductor film 1305c which overlaps with the gate electrode 1307, and the impurity regions 1309 forming source and drain regions are formed in regions of the semiconductor film 1305c which do not overlap with the gate electrode 1307. Similarly, a channel formation region and the impurity regions 1309 are formed in the p-channel thin film transistor 1300e. Although LDD regions are not formed in the p-channel thin film transistors 1300c and 1300e here, LDD regions may be provided in each p-channel thin film transistor and a structure without LDD regions may be employed for each n-channel thin film transistor.

Next, an insulating film with a single layer structure or a stacked-layer structure is formed so as to cover the semiconductor films 1305a to 1305f, the gate electrodes 1307, and the like. Then, conductive films 1313 electrically connected to the impurity regions 1309 and 1311 which form the source and drain regions of the thin film transistors 1300a to 1300f are formed over the insulating film (see FIG. 15A). The insulating film is formed with a single layer or a stacked-layer structure, using an inorganic material such as silicon oxide or silicon nitride, an organic material such as polyimide, polyamide, benzocyclobutene, acrylic, or epoxy, a siloxane material, or the like by a CVD method, a sputtering method, an SOG method, a droplet discharging method, a screen printing method, or the like. In this embodiment mode, the insulating film is formed to have a two-layer structure, and a silicon nitride oxide film is formed as a first-layer insulating film 1312a and a silicon oxynitride film is formed as a second-layer insulating film 1312b. In addition, the conductive films 1313 can form the source and drain electrodes of the thin film transistors 1300a to 1300f.

Before the insulating films 1312a and 1312b are formed or after at least one of the insulating films 1312a and 1312b is formed, heat treatment is preferably performed for recovery of the crystallinity of the semiconductor film, activation of the impurity element which has been added into the semiconductor film, or hydrogenation of the semiconductor film. As the heat treatment, thermal annealing, laser annealing, RTA, or the like may be applied.

The conductive films 1313 are each formed with a single layer or a stacked-layer structure of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the element as its main component by a CVD method, a sputtering method, or the like. An alloy material containing aluminum as its main component corresponds to, for example, a material which contains aluminum as its main component and also contains nickel, or a material which contains aluminum as its main component and also contains nickel and at least one of carbon and silicon. The conductive films 1313 are each preferably formed to have a stacked-layer structure of a barrier film, an aluminum silicon (Al—Si) film, and a barrier film or a stacked-layer structure of a barrier film, an aluminum silicon (Al—Si) film, a titanium nitride film, and a barrier film. Note that the "barrier film" corresponds to a thin film formed of titanium, titanium nitride, molybdenum, or molybdenum nitride. Aluminum and aluminum silicon are suitable materials for forming the conductive films 1313 because they have low resistance value and are inexpensive. When barrier layers are provided as the top and bottom layers, generation of hillocks of aluminum or aluminum silicon can be prevented. In addition, when a barrier film is formed of titanium which is an element having a high reducing property, even if a thin natural oxide film is formed on the crystalline semiconductor film, the natural oxide film can be reduced, and a favorable contact between the conductive films 1313 and the crystalline semiconductor film can be obtained.

Next, an insulating film 1314 is formed so as to cover the conductive films 1313, and conductive films 1315a and 1315b electrically connected to the conductive films 1313 which form the source and drain electrodes of the thin film transistors 1300a and 1300f are formed over the insulating film 1314. In addition, a conductive film 1316 electrically connected to the conductive film 1313 which forms the source or drain electrode of the thin film transistor 1300b is formed. Note that the conductive films 1315a and 1315b and the conductive film 1316 may be formed of the same material at the same time. The conductive films 1315a and 1315b and the conductive film 1316 can be formed of any of the above-described materials described for the conductive film 1313.

Next, a conductive film 1317 functioning as an antenna is formed so as to be electrically connected to the conductive film 1316 (see FIG. 15B).

The insulating film 1314 can be formed with a single layer structure or a stacked-layer structure of an insulating film containing oxygen and/or nitrogen such as silicon oxide, silicon nitride, silicon oxynitride, or silicon nitride oxide; a film containing carbon such as DLC (Diamond-Like Carbon); an organic material such as epoxy, polyimide, polyamide, polyvinyl phenol, benzocyclobutene, or acrylic; or a siloxane material such as a siloxane resin by a CVD method, a sputtering method, or the like. Note that a siloxane material corresponds to a material having a bond of Si—O—Si. Siloxane has a skeleton structure with the bond of silicon (Si) and oxygen (O). As a substituent of siloxane, an organic group containing at least hydrogen (e.g., an alkyl group or aromatic hydrocarbon) is used. Further, a fluoro group may also be used as the substituent. Further alternatively, both a fluoro group and an organic group containing at least hydrogen may be used as the substituent.

The conductive film 1317 is formed of a conductive material by a CVD method, a sputtering method, a printing method such as screen printing or gravure printing, a droplet discharging method, a dispenser method, a plating method, or the like. The conductive film 1317 is formed with a single layer structure or a stacked-layer structure of an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing such an as its main component.

For example, when the conductive film 1317 functioning as an antenna is formed by a screen printing method, the conductive film 1317 can be provided by selective printing of a conductive paste in which conductive particles with a grain diameter of several nanometers to several tens of micrometers are dissolved or dispersed in an organic resin. As the conductive particles, particles of at least one metal selected from silver (Ag), gold (Au), copper (Cu), nickel (Ni), platinum (Pt), palladium (Pd), tantalum (Ta), molybdenum (Mo), titanium (Ti), and the like, fine particles of silver halide thereof, or dispersive nanoparticles thereof. Further, as the organic resin included in the conductive paste, one or more of organic resins which function as a binder, a solvent, a dispersing agent, and a coating material of the metal particles can be used. Typically, organic resins such as an epoxy resin and a silicone resin can be given as examples. In addition, it is preferable that a conductive paste be extruded and then baked to form the conductive film. For example, in the case of using fine particles (e.g., with a grain diameter of 1 nm or more and 100 nm or less) containing silver as its main component as a material of the conductive paste, the conductive paste is baked to harden at temperatures of 150 to 300° C., so that the conductive film can be obtained. Further, it is also possible to use fine particles containing solder or lead-free solder as its main component. In this case, fine particles with a grain diameter of 20 μm or less are preferably used. Solder and lead-free solder have an advantageous of low cost.

The conductive films 1315a and 1315b can function as wirings which are electrically connected to a secondary battery included in the semiconductor device of the present invention in a later step. Alternatively, in forming the conductive film 1317 which functions as an antenna, other conductive films may be separately formed so as to be electrically connected to the conductive films 1315a and 1315b, so that the separately formed conductive films can be utilized as the wirings for connecting to the secondary battery.

Next, after forming an insulating film 1318 so as to cover the conductive film 1317, a layer including the thin film transistors 1300a to 1300f, the conductive film 1317, and the like (hereinafter referred to as an "element formation layer 1319") is peeled off the substrate 1301. Here, after opening portions are Ruined in the element formation layer 1319 excluding the region of the thin film transistors 1300a to 1300f by laser irradiation (e.g., with UV light) (see FIG. 15C), the element formation layer 1319 can be peeled off the substrate 1301 with a physical force. Note that, by performing the peeling off of the element formation layer 1319 while wetting with a liquid such as water, the thin film transistors provided in the element formation layer 1319 can be prevented from being destroyed by static electricity. Further, by reuse of the substrate 1301 from which the element formation layer 1319 has been peeled, cost reduction can be achieved.

The insulating film 1318 can be formed with a single layer structure or a stacked-layer structure of an insulating film containing oxygen and/or nitrogen such as silicon oxide, silicon nitride, silicon oxynitride, or silicon nitride oxide; a film containing carbon such as DLC (Diamond-Like Carbon); an organic material such as epoxy, polyimide, polyamide, polyvinyl phenol, benzocyclobutene, or acrylic; or a siloxane material such as a siloxane resin by a CVD method, a sputtering method, or the like.

In this embodiment mode, after forming the opening portions in the element formation layer 1319 by laser irradiation, a first sheet material 1320 is attached to one surface of the element formation layer 1319 (the surface where the insulating film 1318 has been exposed), and then the element formation layer 1319 is peeled off the substrate 1301 (see FIG. 16A).

Next, a second sheet material 1321 is attached to the other surface of the element formation layer 1319 (the surface which has been exposed by peeling off), followed by one or both of heat treatment and pressurization treatment to attach the second sheet material 1321 (see FIG. 16B). As each of the first sheet material 1320 and the second sheet material 1321, a hot-melt film or the like can be used.

As each of the first sheet material 1320 and the second sheet material 1321, a film on which antistatic treatment for preventing static electricity or the like (hereinafter referred to as an antistatic film) can also be used. As examples of the antistatic film, a film in which an antistatic material is dispersed in a resin, a film to which an antistatic material is attached, and the like can be given. The film provided with an antistatic material can be a film with an antistatic material provided on its one surface, or a film with an antistatic material provided on its both surfaces. The film with an antistatic material provided on its one surface may be attached to the layer so that the antistatic material is placed either on the inner side of the film or the outer side of the film. The antistatic material may be provided either over the entire surface of the film or over a part of the film. As the antistatic material, a metal, indium tin oxide (ITO), or a surfactant such as an amphoteric surfactant, a cationic surfactant, or a nonionic surfactant can be used. Further, as the antistatic material, a resin material which contains a cross-linked copolymer having a carboxyl group and a quaternary ammonium base on its side chain, or the like can be used. Such a material is attached, mixed, or applied to a film, so that an antistatic film can be formed. The element formation layer is sealed with the antistatic film, so that the semiconductor elements can be protected from adverse effects due to external static electricity or the like when being dealt with as a commercial product.

As for the battery provided in the charging circuit of the semiconductor device, a thin-film secondary battery is connected to the conductive films 1315a and 1315b. The connection with the secondary battery may be performed before the element formation layer 1319 is peeled off the substrate 1301 (at the stage shown in FIG. 15B or FIG. 15C), after the element formation layer 1319 is peeled off the substrate 1301 (at the stage shown in FIG. 16A), or after the element formation layer 1319 is sealed with the first sheet material 1320 and the second sheet material 1321 (at the stage shown in FIG. 16B). An example where the element formation layer 1319 and the secondary battery are formed to be connected is described below using FIGS. 17A, 17B, 18A, and 18B.

At the stage shown in FIG. 15B, conductive films 1331a and 1331b which are electrically connected to the conductive films 1315a and 1315b are formed at the same time as the conductive film 1317 which functions as an antenna is formed. Then, the insulating film 1318 is formed so as to cover the conductive films 1317, 1331a, and 1331b, followed by formation of opening portions 1332a and 1332b so that the surfaces of the conductive films 1331a and 1331b are exposed. After that, the opening portions are formed in the element formation layer 1319 by laser irradiation, the first sheet material 1320 is attached to one surface of the element formation layer 1319 (the surface where the insulating film 1318 has been exposed), and then the element formation layer 1319 is peeled off the substrate 1301 (see FIG. 17A).

Next, the second sheet material 1321 is attached to the other surface of the element formation layer 1319 (the surface which has been exposed by peeling off), and the element formation layer 1319 is peeled off the first sheet material 1320. Therefore, a material with low adhesion is used as the first sheet material 1320. Then, conductive films 1334a and 1334b which are electrically connected to the conductive films 1331a and 1331b through the opening portions 1332a and 1332b are selectively formed (see FIG. 17B).

Each of the conductive films 1334a and 1334b is formed of a conductive material by a CVD method, a sputtering method, a printing method such as screen printing or gravure printing, a droplet discharging method, a dispenser method, a plating method, or the like. Each of the conductive films 1334a and 1334b is formed with a single layer structure or a stacked-layer structure of an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing the element as its main component.

Although the example in which the conductive films 1334a and 1334b are formed after peeling the element formation layer 1319 off the substrate 1301 is described in this embodiment mode, the element formation layer 1319 may be peeled off the substrate 1301 after the conductive films 1334a and 1334b are formed.

Next, in the case where a plurality of elements are formed over the substrate, the element formation layer 1319 is cut for each of the elements (see FIG. 18A). A laser irradiation apparatus, a dicing apparatus, a scribing apparatus, or the like can be used for the cutting. Here, the plurality of elements formed over one substrate is separated from one another by laser irradiation.

Next, the separated elements are electrically connected to the secondary battery (see FIG. 18B). In this embodiment mode, a thin-film secondary battery is used as the battery of the charging circuit of the semiconductor device, in which thin-film layers of a power-collecting thin film, a negative electrode active material layer, a solid electrolyte layer, a positive electrode active material layer, and a power-collecting thin film are sequentially stacked.

Each of conductive films 1336a and 1336b is formed of a conductive material by a CVD method, a sputtering method, a printing method such as screen printing or gravure printing, a droplet discharging method, a dispenser method, a plating method, or the like. Each of the conductive films 1336a and 1336b is formed with a single layer structure or a stacked-layer structure of an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing such an element as its main component. It is necessary for the conductive material to have high adhesiveness to a negative electrode active material and low resistance; in particular, aluminum, copper, nickel, vanadium, or the like is preferable.

The structure of the thin-film secondary battery is described next. A negative electrode active material layer 1381 is formed over the conductive film 1336a; in general, vanadium oxide ($V_2O_5$) or the like is used. Next, a solid electrolyte layer 1382 is fowled over the negative electrode active material layer 1381; in general, lithium phosphate ($Li_3PO_4$) or the like is used. Next, a positive electrode active material layer 1383 is formed over the solid electrolyte layer 1382; in general, lithium manganate ($LiMn_2O_4$) or the like is used. Lithium cobaltate ($LiCoO_2$) or lithium nickel oxide ($LiNiO_2$) may be used, as well. Next, a power-collecting thin film 1384 which forms an electrode is formed over the positive electrode active material layer 1383. It is necessary for the power-collecting thin film 1384 to have high adhesiveness to the positive electrode active material layer 1383 and low resistance. For example, aluminum, copper, nickel, vanadium, or the like can be used.

Each of the above thin-film layers of the negative electrode active material layer 1381, the solid electrolyte layer 1382, the positive electrode active material layer 1383, and the power-collecting thin film 1384 may be formed by a sputtering technique or an evaporation technique. The thickness of each layer is preferably 0.1 to 3 μm.

Next, an interlayer film 1385 is formed by applying a resin. The interlayer film 1385 is etched to form contact holes. The interlayer film 1385 is not limited to a resin, but another film such as an oxide film formed by a CVD method or the like may be used; however, a resin is preferable in terms of flatness. Alternatively, a photosensitive resin may be used so that the contact holes are formed without using etching. Next, a wiring layer 1386 is formed over the interlayer film 1385 and connected to the conductive film 1336b. Thus, electrical connection of the secondary battery is obtained.

Here, the conductive films 1334a and 1334b which are provided in the element formation layer 1319 are connected to the conductive films 1336a and 1336b which are connection terminals of the thin-film secondary battery 1389, in advance. Described here is the case where electrical connection between the conductive films 1334a and 1336a and electrical connection between the conductive films 1334b and 1336b is performed by pressure bonding with an adhesive material such as an anisotropic conductive film (ACF) or an anisotropic conductive paste (ACP) interposed therebetween. In this embodiment mode, the example in which the connection is performed using conductive particles 1338 included in an adhesive resin 1337 is described. Alternatively, a conductive adhesive such as a silver paste, a copper paste, or a carbon paste; solder joint; or the like can be used for connection.

Note that the structure of each transistor can have various modes without being limited to the specific one shown in this embodiment mode. For example, a multi-gate structure having two or more gate electrodes may be employed. When a multi-gate structure, a structure in which channel regions seems to be connected in series is realized; therefore, a structure in which a plurality of transistors seems to be connected in series is obtained. By employing the multi-gate structure, off-current can be reduced, withstand voltage of the transistor can be increased, so that the reliability is increased, and even if the drain-source voltage varies when the transistor operates in the saturation region, the drain-source current does not vary very much, and thus flat characteristics can be obtained. Further, a structure in which gate electrodes are formed above and below a channel may also be employed. By employing the structure in which gate electrodes are formed above and below a channel, since the channel region is enlarged, the amount of current flowing therethrough can be increased, and a depletion layer can be easily formed so that the subthreshold factor (S value) can be decreased. When gate electrodes are formed above and below a channel, a structure in which a plurality of transistors seems to be connected in parallel is realized.

Further, each transistor may also have any of the following structures: a structure in which a gate electrode is fowled above a channel; a structure in which a gate electrode is formed below a channel; a staggered structure; and an inverted staggered structure. Further, a channel region may be divided into a plurality of regions, and the divided regions may be connected in parallel or in series. Further, a channel (or part thereof) may overlap with a source electrode or a drain electrode. By employing a structure in which a channel (or part thereof) overlaps with a source electrode or a drain electrode, electric charges can be prevented from being accumulated in part of the channel and thus unstable operation can be prevented. Further, an LDD (Lightly Doped Drain) region may be provided. With an LDD region, off-current can be reduced, and the withstand voltage of the transistor can be increased, so that the reliability is increased, and even if the drain-source voltage varies when the transistor operates in the saturation region, the drain-source current does not vary very much, and thus flat characteristics can be obtained.

The method for manufacturing the semiconductor device in this embodiment mode can be applied to the semiconductor device in any other embodiment mode in this specification.

(Embodiment Mode 9)

In this embodiment mode, a method for manufacturing a semiconductor device, which is different from Embodiment Mode 8, is described using drawings. In this embodiment mode, the case where elements and the like included in circuits such as a limiter circuit, a logic circuit, and a charging circuit of a semiconductor device are provided over the same semiconductor substrate is described. Further, an example in which the secondary battery described in Embodiment Mode 8 is used as a battery included in the charging circuit is described. It is needless to say that an electric double layer capacitor or the like may also be provided instead of the secondary battery.

Figure 19A:
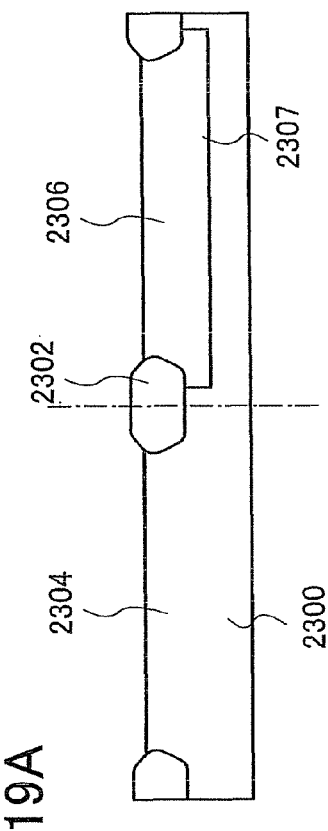
FIGS. 19A to 19C are diagrams showing one example of a manufacturing method of a semiconductor device of the present invention.

First, insulating films (also referred to as field oxide films) 2302 are formed on a semiconductor substrate 2300, whereby regions (also referred to as element formation regions or element separation regions) 2304 and 2306 are formed (see FIG. 19A). The regions 2304 and 2306 provided in the semiconductor substrate 2300 are separated from each other by the insulating film 2302. The example described here is the case where a single crystal Si substrate having n-type conductivity is used as the semiconductor substrate 2300, and a p-well 2307 is formed in the region 2306 of the semiconductor substrate 2300.

Any substrate can be used as the semiconductor substrate 2300 as long as it is a semiconductor substrate. For example, a single crystal Si substrate having n-type or p-type conductivity, a compound semiconductor substrate (e.g., a GaAs substrate, an InP substrate, a GaN substrate, a SiC substrate, a sapphire substrate, or a ZnSe substrate), an SOI (Silicon on Insulator) substrate formed by a bonding method or a SIMOX (Separation by Implanted Oxygen) method, or the like can be used.

The regions 2304 and 2306 can be formed by a LOCOS (Local Oxidation of Silicon) method, a trench isolation method, or the like.

In addition, the p-well 2307 formed in the region 2306 of the semiconductor substrate 2300 can be formed by selective doping of the semiconductor substrate 2300 with a p-type impurity element. As the p-type impurity element, boron (B), aluminum (Al), gallium (Ga), or the like can be used.

In this embodiment mode, although the region 2304 is not doped with an impurity element because a semiconductor substrate having n-type conductivity is used as the semiconductor substrate 2300, an n-well may be formed in the region 2304 by introduction of an n-type impurity element. As the n-type impurity element, phosphorus (P), arsenic (As), or the like can be used. When a semiconductor substrate having p-type conductivity is used, on the other hand, the region 2304 may be doped with an n-type impurity element to form an n-well, and the region 2306 may be doped with no impurity element.

Figure 19B:
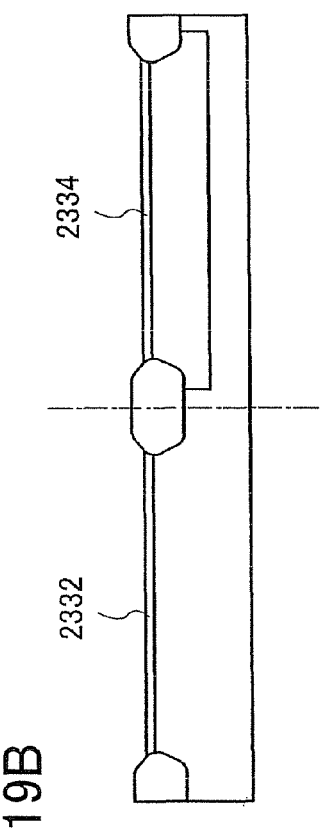

Next, insulating films 2332 and 2334 are formed so as to cover the regions 2304 and 2306 respectively (see FIG. 19B).

For example, surfaces of the regions 2304 and 2306 provided in the semiconductor substrate 2300 are oxidized by heat treatment, so that the insulating films 2332 and 2334 can be each formed of silicon oxide films. Alternatively, a silicon oxide film may be formed by a thermal oxidation method and then the surface of the silicon oxide film may be nitrided by nitridation treatment, so that the insulating films 2332 and 2334 are each formed to have a stacked-layer structure of a silicon oxide film and a film containing oxygen and nitrogen (a silicon oxynitride film).

Further alternatively, the insulating films 2332 and 2334 may be formed by plasma treatment as described above. For example, the insulating films 2332 and 2334 can be each formed of a silicon oxide film or a silicon nitride film by application of high-density plasma treatment to the surfaces of the regions 2304 and 2306 provided in the semiconductor substrate 2300. Furthermore, after applying high-density plasma oxidation treatment to the surfaces of the regions 2304 and 2306, high-density plasma nitridation treatment may be performed. In this case, silicon oxide films are formed on the surfaces of the regions 2304 and 2306, and then silicon oxynitride films are formed on the silicon oxide films, so that the insulating films 2332 and 2334 are each formed to have a stacked-layer structure of the silicon oxide film and the silicon oxynitride film. Alternatively, after silicon oxide films are formed on the surfaces of the regions 2304 and 2306 by a thermal oxidation method, high-density plasma oxidation or high-density nitridation treatment may be applied to the silicon oxide films.

The insulating films 2332 and 2334 formed over the regions 2304 and 2306 of the semiconductor substrate 2300 function as gate insulating films of transistors which are completed later.

Figure 19C:
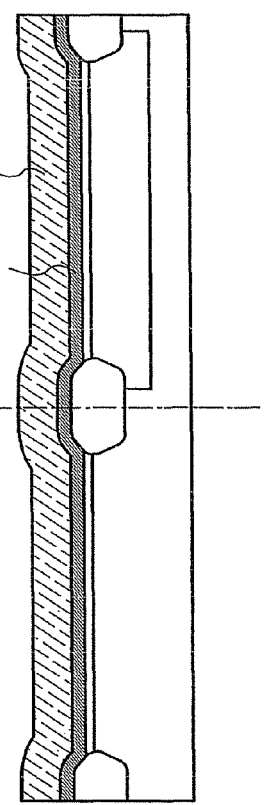

Next, a conductive film is formed so as to cover the insulating films 2332 and 2334 which are formed over the regions 2304 and 2306 (see FIG. 19C). An example in which the conductive film is formed by sequentially stacking conductive films 2336 and 2338 is described here. Needless to say, the conductive film may be formed with a single layer structure or a stacked-layer structure including three or more layers.

As materials of the conductive films 2336 and 2338, an element selected from tantalum (Ta), tungsten (W), titanium (Ti), molybdenum (Mo), aluminum (Al), copper (Cu), chromium (Cr), niobium (Nb), and the like, or an alloy material or a compound material containing such an element as its main component can be used. Alternatively, a metal nitride film obtained by nitridation of the above element can be used. Further, a semiconductor material typified by polycrystalline silicon doped with an impurity element such as phosphorus can also be used.

Here, a stacked-layer structure is employed in which the conductive film 2336 is formed of tantalum nitride and the conductive film 2338 is formed of tungsten thereover. Alternatively, the conductive film 2336 can be formed of a single-layer film or a stacked-layer film of tungsten nitride, molybdenum nitride, and/or titanium nitride and the conductive film 2338 can be formed of a single-layer film or a stacked-layer film of tantalum, molybdenum, and/or titanium.

Figure 20A:
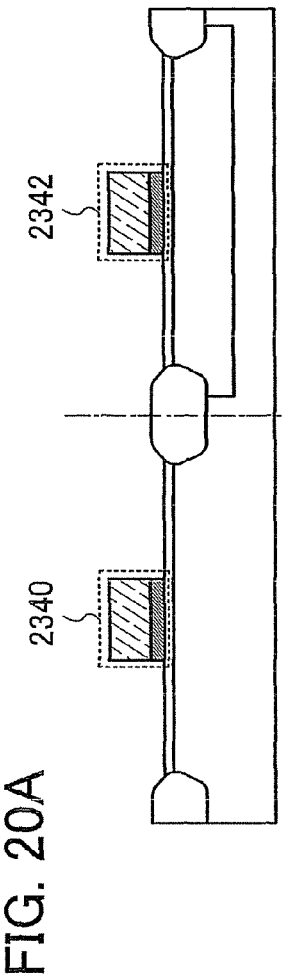
FIGS. 20A to 20C are diagrams showing one example of a manufacturing method of a semiconductor device of the present invention.

Next, the stacked conductive films 2336 and 2338 are selectively removed by etching, so that the conductive films 2336 and 2338 remain above parts of the regions 2304 and 2306, whereby gate electrodes 2340 and 2342 are formed (see FIG. 20A).

Figure 20B:
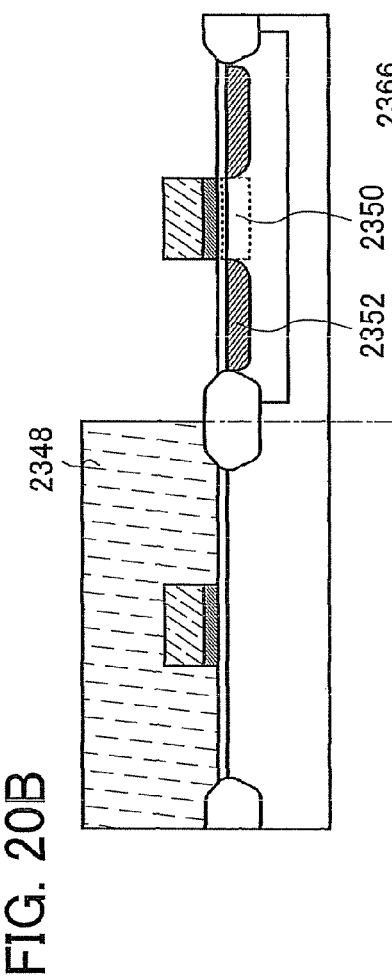

Next, a resist mask 2348 is selectively formed so as to cover the region 2304, and the region 2306 is doped with an impurity element, using the resist mask 2348 and the gate electrode 2342 as masks, so that impurity regions are formed (see FIG. 20B). As the impurity element, an n-type impurity element or a p-type impurity element is used. As the n-type impurity element, phosphorus (P), arsenic (As), or the like can be used. As the p-type impurity element, boron (B), aluminum (Al), gallium (Ga), or the like can be used. Here, phosphorus (P) is used as the impurity element.

In FIG. 20B, by introduction of the impurity element, impurity regions 2352 which form source and drain regions and a channel formation region 2350 are formed in the region 2306.

Figure 20C:
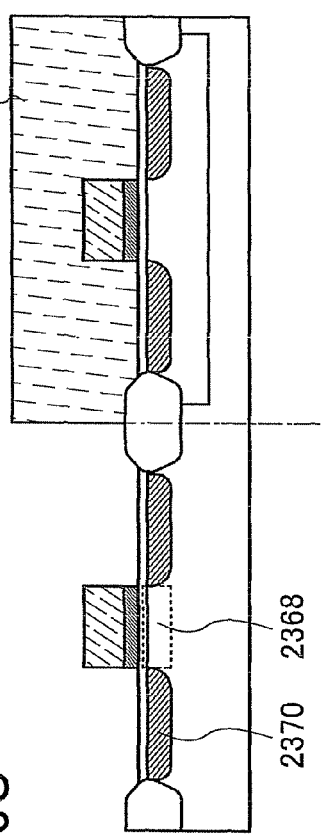

Next, a resist mask 2366 is selectively formed so as to cover the region 2306, and the region 2304 is doped with an impurity element, using the resist mask 2366 and the gate electrode 2340 as masks, so that impurity regions are formed (see FIG. 20C). As the impurity element, an n-type impurity element or a p-type impurity element is used. As the n-type impurity element, phosphorus (P), arsenic (As), or the like can be used. As the p-type impurity element, boron (B), aluminum (Al), gallium (Ga), or the like can be used. Here, an impurity element (e.g., boron (B)) having a conductivity type different from that of the impurity element introduced into the region 2306 in FIG. 20B is used. As a result, impurity regions 2370 which form source and drain regions and a channel formation region 2368 are formed in the region 2304.

Figure 21A:
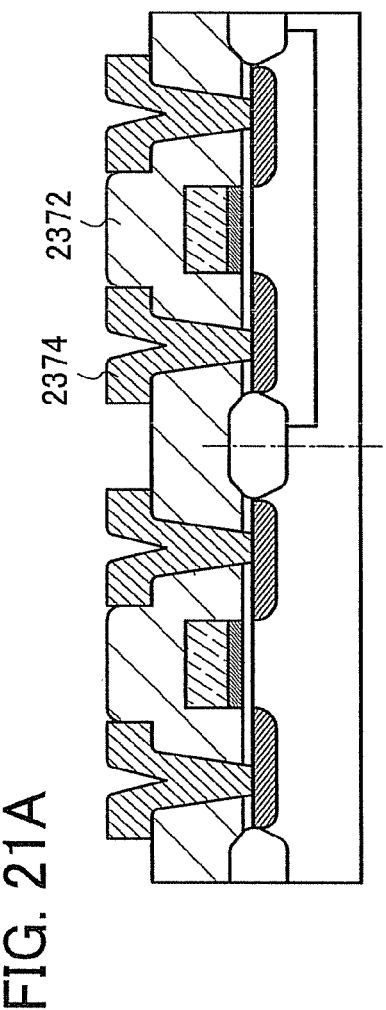
FIGS. 21A and 21B are diagrams showing one example of a manufacturing method of a semiconductor device of the present invention.

Next, a second insulating film 2372 is formed so as to cover the insulating films 2332 and 2334 and the gate electrodes 2340 and 2342. Then, wirings 2374, which are electrically connected to the impurity regions 2352 and 2370 formed in the regions 2306 and 2304 respectively, are formed over the second insulating film 2372 (see FIG. 21A).

The second insulating film 2372 can be formed with a single layer structure or a stacked-layer structure of an insulating film containing oxygen and/or nitrogen such as silicon oxide, silicon nitride, silicon oxynitride, or silicon nitride oxide; a film containing carbon such as DLC (Diamond-Like Carbon); an organic material such as epoxy, polyimide, polyamide, polyvinyl phenol, benzocyclobutene, or acrylic; or a siloxane material such as a siloxane resin by a CVD method, a sputtering method, or the like. A siloxane material corresponds to a material having a bond of Si—O—Si. Siloxane has a skeleton structure with the bond of silicon (Si) and oxygen (O). As a substituent of siloxane, an organic group containing at least hydrogen (e.g., an alkyl group or aromatic hydrocarbon) is used. Also, a fluoro group may be used as the substituent, or both a fluoro group and an organic group containing at least hydrogen may be used.

The wirings 2374 are each formed of a single layer or a stacked layer of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing such an element as its main component by a CVD method, a sputtering method, or the like. An alloy material containing aluminum as its main component corresponds to, for example, a material which contains aluminum as its main component and also contains nickel, or a material which contains aluminum as its main component and also contains nickel and at least one of carbon and silicon. The wirings 2374 are each preferably formed to have a stacked-layer structure of a barrier film, an aluminum-silicon (Al—Si) film, and a barrier film or a stacked-layer structure of a barrier film, an aluminum-silicon (Al—Si) film, a titanium nitride film, and a barrier film. Note that the "barrier film" corresponds to a thin film formed of titanium, titanium nitride, molybdenum, or molybdenum nitride. Aluminum and aluminum silicon are suitable materials for forming the wirings 2374 because they have high resistance values and are inexpensive. When barrier layers are provided as the top layer and the bottom layer, generation of hillocks of aluminum or aluminum silicon can be prevented. Further, when a barrier film is formed of titanium which is an element having a high reducing property, even if a thin natural oxide film is formed on the crystalline semiconductor film, the natural oxide film can be reduced, and favorable contact between the wirings 2374 and the crystalline semiconductor film can be obtained.

It is to be noted that the structure of each transistor of the present invention is not limited to the one shown in the drawings. For example, a transistor with an inverted staggered structure, a FinFET structure, or the like can be used. A FinFET structure is preferable because a short channel effect which occurs along with reduction in transistor size can be suppressed.

Figure 21B:
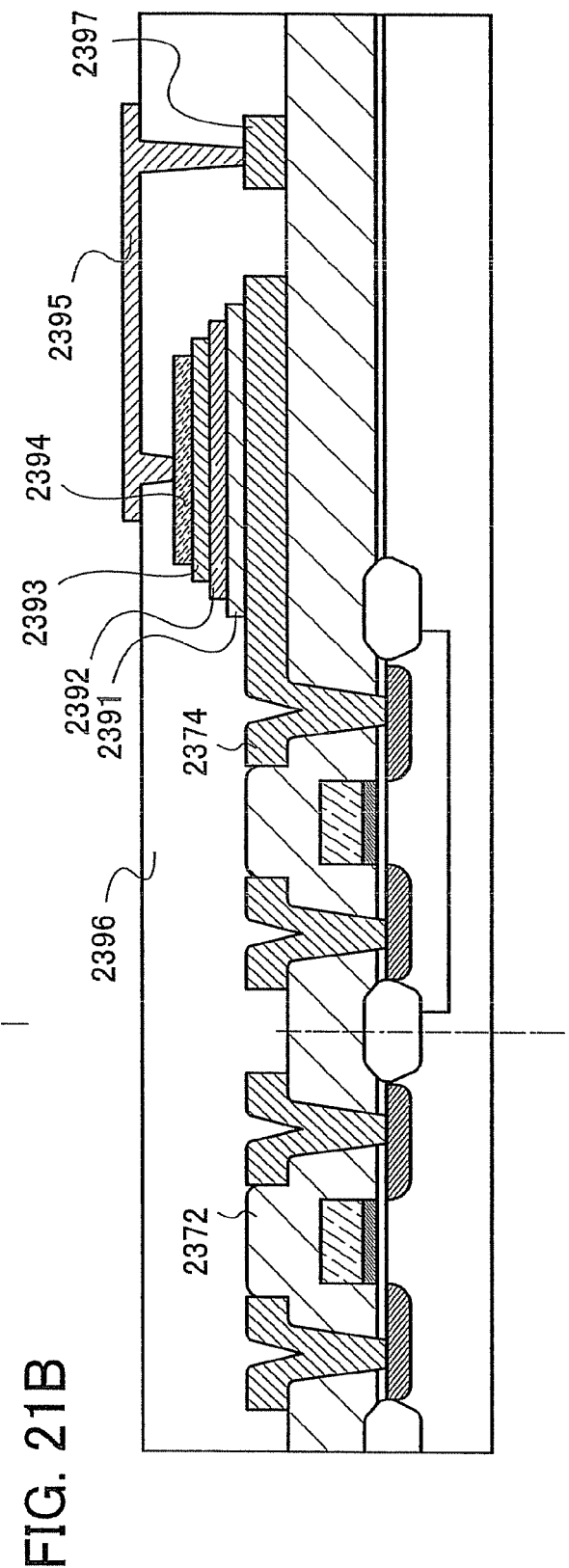

In this embodiment mode, the secondary battery is stacked over the wiring 2374 connected to the transistor. The secondary battery has a structure in which thin-film layers of a power-collecting thin film, a negative electrode active material layer, a solid electrolyte layer, a positive electrode active material layer, and a power-collecting thin film are sequentially stacked (see FIG. 21B). Therefore, it is necessary for the material of the wiring 2374 which also has a function of the power-collecting thin film of the secondary battery to have high adhesiveness to a negative electrode active material and also low resistance; in particular, aluminum, copper, nickel, vanadium, or the like is preferable.

Subsequently, the structure of the thin-film secondary battery is described. A negative electrode active material layer 2391 is fowled over the wiring 2374; in general, vanadium oxide ($V_2O_5$) or the like is used. Next, a solid electrolyte layer 2392 is formed over the negative electrode active material layer 2391; in general, lithium phosphate ($Li_3PO_4$) or the like is used. Next, a positive electrode active material layer 2393 is formed over the solid electrolyte layer 2392; in general, lithium manganate ($LiMn_2O_4$) or the like is used. Lithium cobaltate ($LiCoO_2$) or lithium nickel oxide ($LiNiO_2$) may be used, as well. Next, a power-collecting thin film 2394 which forms an electrode is formed over the positive electrode active material layer 2393. It is necessary for the power-collecting thin film 2394 to have high adhesiveness to the positive electrode active material layer 2393 and also low resistance; and aluminum, copper, nickel, vanadium, or the like can be used.

Each of the above-described thin-film layers of the negative electrode active material layer 2391, the solid electrolyte layer 2392, the positive electrode active material layer 2393, and the power-collecting thin film 2394 may be formed by a sputtering technique or an evaporation technique. Further, the thickness of each layer is preferably 0.1 to 3 μm.

Next, an interlayer film 2396 is formed by applying a resin. The interlayer film 2396 is etched to form contact holes. The interlayer film is not limited to a resin, and another film such as an oxide film formed by a CVD method or the like may also be used; however, a resin is preferable in terms of flatness. Further, a photosensitive resin may also be used, so that the contact holes are formed without etching. Next, a wiring layer 2395 is formed over the interlayer film 2396 and connected to a wiring 2397. In this manner, electrical connection of the secondary battery can be obtained.

With the above-described structure, the semiconductor device of the present invention can employ a structure in which transistors are fanned using a single crystal substrate and a thin-film secondary battery is formed thereover. Accordingly, the semiconductor device of the present invention having a lot of flexibility in physical form can be provided in which the thickness and size is reduced.

The method for manufacturing the semiconductor device in this embodiment mode can be applied to the semiconductor device in any other embodiment mode in this specification.

(Embodiment Mode 10)

Use application of the semiconductor device for communicating data by wireless communication of the present invention and a communication system using the semiconductor device is described in this embodiment. For example, the semiconductor device of the present invention can be provided for bills; coins; securities; bearer bonds; certificates (including driver's licenses and resident's cards); packing containers (including wrapping paper and bottles); DVD (Digital Versatile Disc) software; and CDs (compact discs). Further, the semiconductor device of the present invention can also be provided for recording media such as video tapes; vehicles such as cars, motorcycles, and bicycles; personal belongings such as bags and glasses; foods; clothes; commodities; electronic appliances; and the like. The electronic appliances include a liquid crystal display device, an EL (electroluminescence) display device, a television device (also called simply a television or a television receiver), a mobile phone, and the like.

The semiconductor device of the present invention can be fixed to an object by being attached to a surface of the object or embedded in the object. For example, the semiconductor device may be embedded in paper of a book, or an organic resin of a package formed of the organic resin. The semiconductor device being provided for bills, coins, securities, bearer bonds, certificates, and the like can prevent forgery of them. Further, the semiconductor device being provided for wrapping containers, recording media, personal belongings, foods, clothes, commodities, electronic appliances, and the like can improve the efficiency of an inspection system, a system of a rental shop, and the like. Further, the semiconductor device being provided for vehicles can prevent forgery or theft of the vehicles. Further, the semiconductor device being implanted into creatures such as animals can identify each creature easily. For example, by implementing a wireless tag into creatures such as domestic animals, the year of birth, sex, breed, and the like thereof can be easily identified.

As described above, the semiconductor device of the present invention can be provided for any object (including creatures).

Figure 22A:
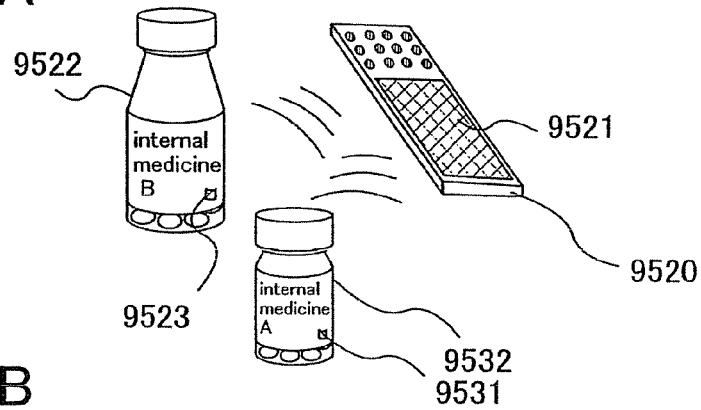
FIGS. 22A to 22C are diagrams each showing one example of a usage pattern of a semiconductor device of the present invention.
Figure 22B:
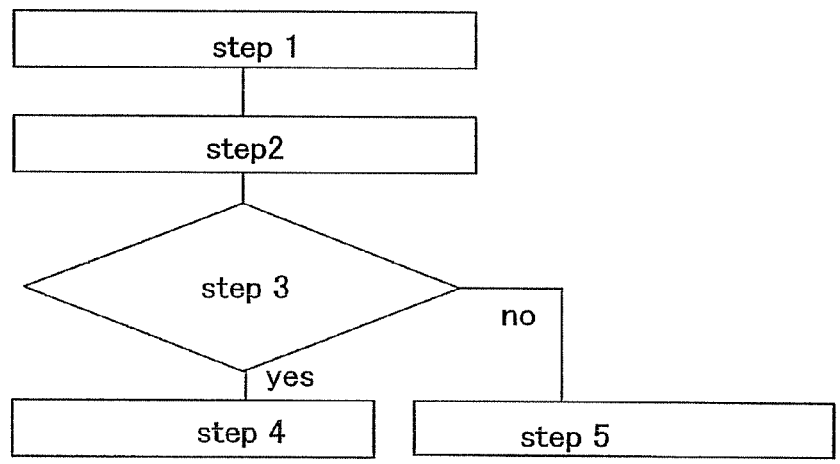

Next, one mode of a system using the semiconductor device is described using FIG. 22A. A terminal 9520 including a display portion 9521 is provided with an antenna and a reader/writer connected to the antenna. An object A 9532 is provided with a semiconductor device 9531 of the present invention and an object B 9522 is provided with a semiconductor device 9523 of the present invention. In FIG. 22A, internal medicine is shown as each example of the objects A and B. When the antenna of the terminal 9520 is held close to the semiconductor device 9531 included in the object A 9532, the display portion 9521 displays information on the object A 9532 such as a raw material, a place of origin, a test result in each production process, a record of distribution, and description of the article. When the antenna of the terminal 9520 is held close to the semiconductor device 9523 included in the object B 9522, the display portion 9521 displays information on the object B 9522 such as a raw material, a place of origin, a test result in each production process, a record of distribution, and description of the object. An example of a business model utilizing the system shown in PIG 22A is described using a flow chart shown in FIG. 22B.

Information on allergy is input to the terminal 9520 (a step 1). The information on allergy is information on medical products, their components, or the like that may cause allergic reactions to certain people. As described above, information on the internal medicine A, which is the object A 9532, is obtained by the antenna provided for the terminal 9520 (a step 2). The information on the internal medicine A includes information on the components or the like of the internal medicine A. The information on allergy is compared with the obtained information on components or the like of the internal medicine A, thereby determining whether or not to coincide with each other (a step 3). If they coincide with each other, a user of the terminal 9520 is alerted that certain people may have allergic reactions to the internal medicine A (a step 4). If they do not coincide with each other, the user of the terminal 9520 is informed that certain people are at low risk of having allergic reactions to the internal medicine A (the fact that the internal medicine A is safe) (a step 5). In each of the step 4 and the step 5, in order to inform the user of the terminal 9520 of the information, the information may be displayed on the display portion 9521 of the terminal 9520 or an alarm of the terminal 9520 or the like may be sounded.

Figure 22C:
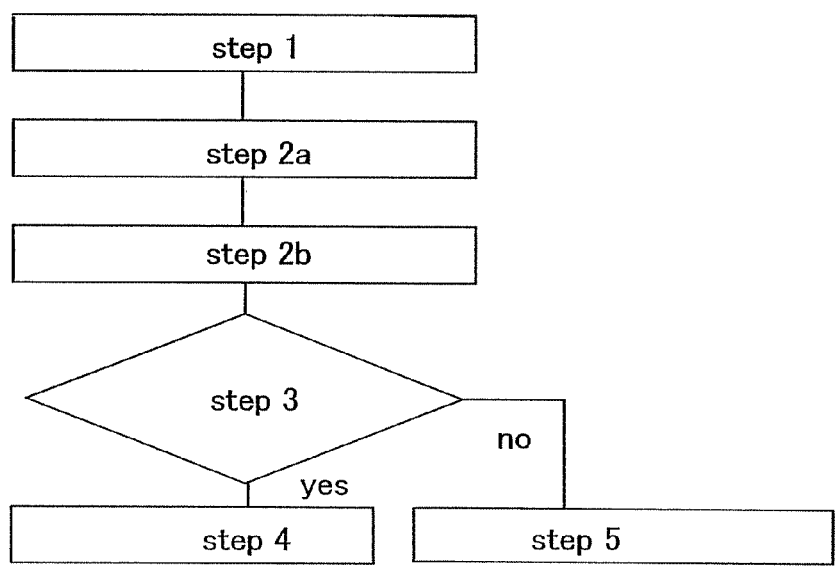

Further, an example of another business model thereof is shown in FIG. 22C. Information on a combination of internal medicines which are dangerous when taken at the same time or a combination of components of internal medicines which are dangerous when taken at the same time (hereinafter referred to as combination information) is input to the terminal 9520 (a step 1). As described above, information on the internal medicine A, which is the object A 9532, is obtained by the antenna provided for the terminal 9520 (a step 2*a*). The information on the internal medicine A includes information on components and the like of the internal medicine A. Next, as described above, information on the internal medicine B, which is the object B 9522, is obtained by the antenna provided for the terminal 9520 (a step 2*b*). The information on the internal medicine B includes information on components and the like of the internal medicine B. In this way, information on a plurality of internal medicines is obtained. The combination information is compared with the obtained information on the plurality of internal medicines, thereby determining whether or not to coincide with each other, that is, whether a combination of components of internal medicines which are dangerous when taken at the same time is contained or not (a step 3). If they coincide with each other, the user of the terminal 9520 is alerted (a step 4). If they do not coincide with each other, the user of the terminal 9520 is informed of the safety (a step 5). In each of the step 4 and the step 5, in order to inform the user of the terminal 9520 of the information, the information may be displayed on the display portion 9521 of the terminal 9520 or an alarm of the terminal or the like may be sounded.

This embodiment mode can be combined with any technical element of the other embodiment modes in this specification. That is, by using the present invention, impedance matching between an antenna and a chip itself included in a semiconductor device can be deviated intentionally. Therefore, a problem caused by a large amount of electric power received by a semiconductor device in such a case where the communication distance between the semiconductor device and a reader/writer is extremely short can be prevented, so that improvement in reliability of a semiconductor device can be achieved. That is, without deteriorating an internal element of a semiconductor device or destroying a semiconductor device itself, the semiconductor device can operate normally.

This application is based on Japanese Patent Application Serial No. 2006349381 filed in Japan Patent Office on Dec. 26, 2006, the entire contents of which are hereby incorporated by reference.

What is claimed is:

1. A semiconductor device comprising:
   an antenna;
   a first AC/DC converter circuit electrically connected to the antenna;
   a second AC/DC converter circuit electrically connected to the antenna through a switching element;
   a detecting circuit configured to control operation of the switching element in accordance with a value of a voltage output from the first AC/DC converter circuit; and
   a battery configured to store electric power supplied from the antenna through the second AC/DC converter circuit.

2. The semiconductor device according to claim 1, wherein the battery is electrically connected to the second AC/DC converter circuit through a charge controller circuit.

3. A semiconductor device comprising:
   an antenna;
   a first AC/DC converter circuit electrically connected to the antenna;
   a second AC/DC converter circuit electrically connected to the antenna through a switching element;
   a detecting circuit configured to control operation of the switching element in accordance with a value of a voltage output from the first AC/DC converter circuit;
   a battery configured to store electric power supplied from the antenna through the second AC/DC converter circuit; and
   a logic circuit configured to receive a first electric power from the antenna through the first AC/DC converter circuit and a second electric power from the battery.

4. The semiconductor device according to claim 3, wherein the battery is electrically connected to the second AC/DC converter circuit through a charge controller circuit.

5. The semiconductor device according to claim 3, wherein the logic circuit includes an encoding circuit, a controller circuit, a judging circuit, and a memory.

6. A semiconductor device comprising:
   an antenna;
   a first AC/DC converter circuit electrically connected to the antenna;
   a second AC/DC converter circuit electrically connected to the antenna through a first switching element;
   a first detecting circuit configured to control operation of the first switching element in accordance with a value of a voltage output from the first AC/DC converter circuit;
   a battery configured to store electric power supplied from the antenna through the second AC/DC converter circuit;
   a second detecting circuit configured to control a second switching element and a third switching element in accordance with the value of the voltage output from the first AC/DC converter circuit; and
   a logic circuit configured to receive a first electric power from the antenna through the first AC/DC converter circuit and the second switching element and a second electric power from the battery through the third switching element.

7. The semiconductor device according to claim 6, wherein the battery is electrically connected to the second AC/DC converter circuit through a charge controller circuit.

8. The semiconductor device according to claim 6, wherein the logic circuit includes an encoding circuit, a controller circuit, a judging circuit, and a memory.

9. A semiconductor device comprising:
- an antenna;
- a first AC/DC converter circuit electrically connected to the antenna;
- a second AC/DC converter circuit electrically connected to the antenna through a first switching element;
- a first detecting circuit configured to control operation of the first switching element in accordance with a value of a voltage output from the first AC/DC converter circuit;
- a battery configured to store electric power supplied from the antenna through the second AC/DC converter circuit;
- a constant voltage circuit electrically connected to the first AC/DC converter circuit and electrically connected to the battery through a second switching element; and
- a second detecting circuit configured to control operation of the second switching element in accordance with a value of a voltage output from the constant voltage circuit.

10. The semiconductor device according to claim 9, wherein the battery is electrically connected to the second AC/DC converter circuit through a charge controller circuit.

11. The semiconductor device according to claim 9, wherein the constant voltage circuit includes a reference circuit and a differential amplifier circuit.

12. A semiconductor device comprising:
- a first AC/DC converter circuit to produce a first voltage in accordance with a first signal;
- a second AC/DC converter circuit to produce a second voltage in accordance with the first signal;
- a switching element configured to select one of at least a first state and a second state, wherein the first state is that the first signal is supplied to the second AC/DC converter circuit, and the second state is that the first signal is not supplied to the second AC/DC converter circuit;
- a detecting circuit configured to control operation of the switching element in accordance with a value of a voltage output from the first AC/DC converter circuit; and
- a battery configured to store electric power supplied from the second AC/DC converter circuit.

13. The semiconductor device according to claim 12, wherein the battery is electrically connected to the second AC/DC converter circuit through a charge controller circuit.

* * * * *

UNITED STATES PATENT AND TRADEMARK OFFICE
CERTIFICATE OF CORRECTION

PATENT NO. : 8,482,261 B2  
APPLICATION NO. : 13/447397  
DATED : July 9, 2013  
INVENTOR(S) : Kiyoshi Kato et al.

Page 1 of 1

It is certified that error appears in the above-identified patent and that said Letters Patent is hereby corrected as shown below:

In the Specification:

Column 3, line 42; Change "fowled" to --formed--.
Column 4, line 5; Change "fowling" to --forming--.
Column 4, line 42; Change "source-chain" to --source-drain--.
Column 12, line 33; Change "OPP" to --OFF--.
Column 12, line 40; Change "OPE" to --OFF--.
Column 15, line 63; Change "fowled" to --formed--.
Column 18, line 7; Change "plus a," to --plus α,--.
Column 18, line 20; Change "fowled" to --formed--.
Column 20, line 30; Change "fly)" to --Vy)--.
Column 22, line 14; Change "foamed" to --formed--.
Column 22, line 63; Change "fanned" to --formed--.
Column 23, line 38; Change "fanned" to --formed--.
Column 24, line 9; Change "YAC" to --YAG,--.
Column 28, line 13; Change "an as" to --an element as--.
Column 28, line 55; Change "Ruined" to --formed--.
Column 31, line 1; Change "fowled" to --formed--.
Column 32, line 2; Change "fowled" to --formed--.
Column 35, line 42; Change "fowled" to --formed--.
Column 36, line 7; Change "fanned" to --formed--.
Column 37, line 7; Change "PIG 22A" to --FIG. 22A--.

Signed and Sealed this  
Twenty-fourth Day of December, 2013

Margaret A. Focarino  
*Commissioner for Patents of the United States Patent and Trademark Office*